United States Patent [19]
Yaguchi et al.

[11] Patent Number: 5,889,596
[45] Date of Patent: *Mar. 30, 1999

[54] CONTROLLING A READING UNIT OF AN IMAGE PROCESSING APPARATUS

[75] Inventors: Hiroyuki Yaguchi, Inagi; Ryosuke Miyamoto, Urayasu; Hideto Kohtani; Hideaki Shimizu, both of Yokohama; Hiroyoshi Yoshida, Fujisawa; Masao Watanabe, Kawasaki; Akihito Mori, Yokohama; Yasuhiro Takiyama; Katsunari Suzuki, both of Kawasaki; Tadashi Takahashi, Yokohama; Tsuyoshi Moriyama, Hachioji, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 680,863

[22] Filed: Jul. 16, 1996

[30] Foreign Application Priority Data

Jul. 17, 1995 [JP] Japan .................................. 7-180073
Apr. 15, 1996 [JP] Japan .................................. 8-092467

[51] Int. Cl.⁶ .................................................. H04N 1/42
[52] U.S. Cl. ........................................ 358/448; 358/498
[58] Field of Search .......................... 358/448, 432–433, 358/261.1–261.4, 426–427, 498, 298

[56] References Cited

U.S. PATENT DOCUMENTS 5,216,516  6/1993  Tanaka et al. ........................ 358/426
5,253,077  10/1993  Hasegawa et al. .................... 358/404
5,465,172  11/1995  Fukushima et al. ................... 358/498

FOREIGN PATENT DOCUMENTS 0576226  12/1993  European Pat. Off. .
576226  12/1993  European Pat. Off. .
0606076  7/1994  European Pat. Off. .
606076  7/1994  European Pat. Off. .
5244367  9/1993  Japan .
5336321  12/1993  Japan .

OTHER PUBLICATIONS

Pat.Abs.Jp., vol. 017, No. 710 (E–1484), Dec. 24, 1993 (JP 05 244367 A).

Pat.Abs.Jp., vol. 018, No. 165 (E–1527), Dec 17, 1993 (JP 05 336321 A).

*Primary Examiner*—Scott Rogers
*Assistant Examiner*—Stephen Brinich
*Attorney, Agent, or Firm*—Fitzpatrick, Cella, Harper & Scinto

[57] ABSTRACT

An image processing apparatus includes a read unit for reading a document sheet to generate image data, a data compression unit for compressing the image data generated by the read unit, a prediction unit for predicting data amount after the compression for the image data to be compressed by the data compression unit and a control unit for controlling the reading of the document sheet by the read means in accordance with the prediction result by the prediction means.

22 Claims, 31 Drawing Sheets

FIG. 12
(a)
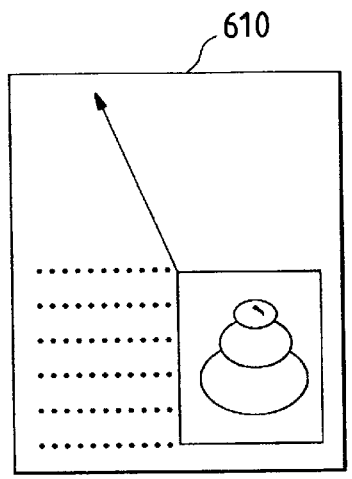
(b)
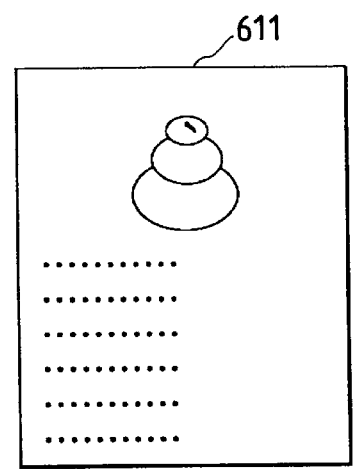
FIG. 13
(a)
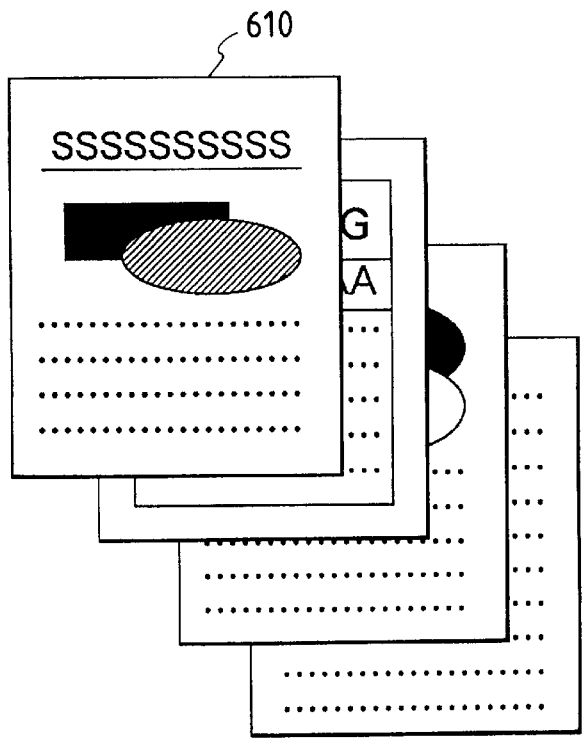
(b)
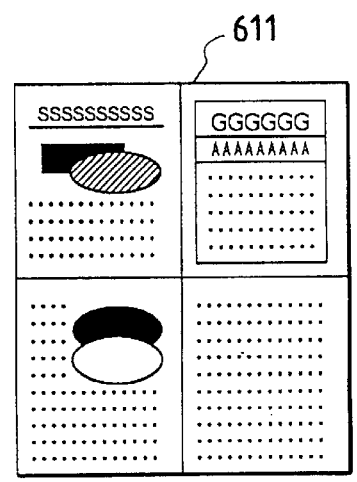

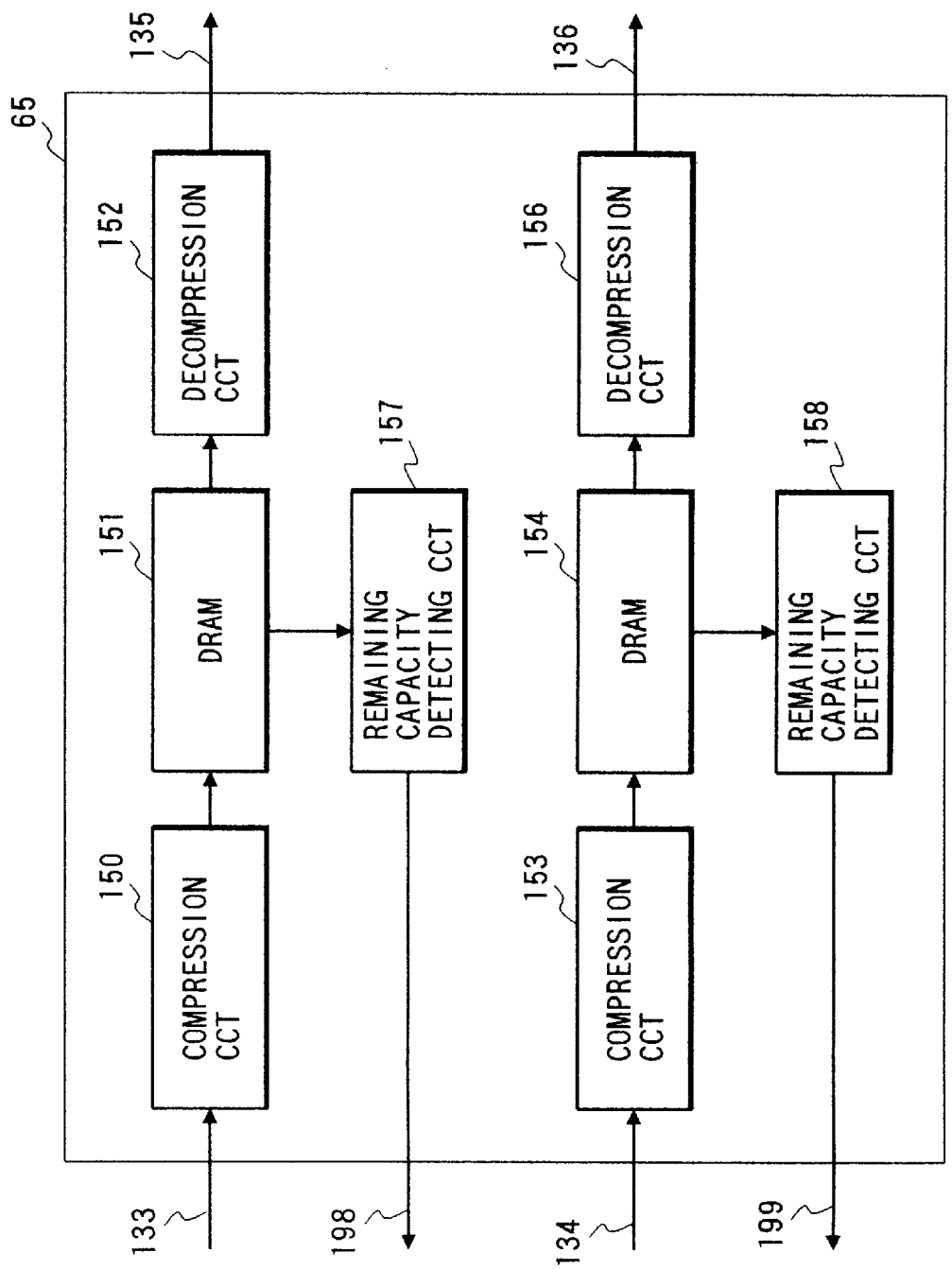

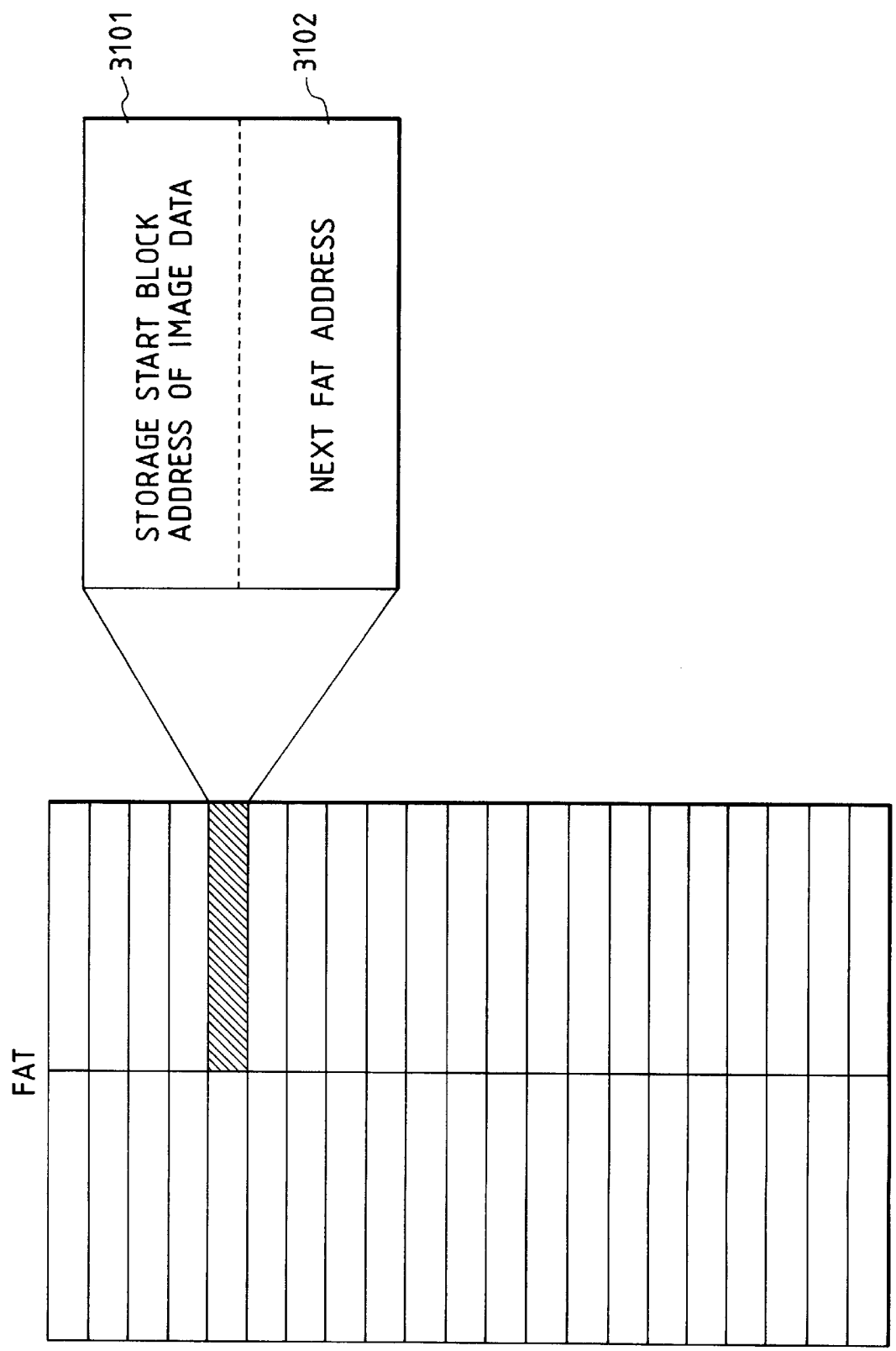

CONTROLLING A READING UNIT OF AN IMAGE PROCESSING APPARATUS

BACKGROUND OF THE INVENTION

1. Field of the Invention

The present invention relates to image processing apparatus and method for reading a document sheet image and processing image data derived therefrom.

2. Related Background Art

In the field of the image processing apparatus, it has been known to read a document sheet by an image input unit, convert it to an electrical signal, apply image processing to the signal by an image processing unit and record it as an image by an output unit such as a laser beam printer. In a certain image processing apparatus, an image memory unit is provided in the image processing unit so that the document sheet once read by the image input unit is outputted to the laser beam printer from the image memory unit a plurality of times to form a plurality of sheets of image.

Further, it has been proposed that an image compression unit and an image decompression unit are built in before and after the image memory unit to attain effective operation of the image memory unit and this technique is being used in an application of electronic sorter for example.

On the other hand, an image compressing method which provides high efficiency and no degradation of quality is desired. To this end, the MH coding method and the Q-Coder which makes use of arithmetic coding have been known.

In the prior art digital copying machine, a document sheet is fed onto a plate glass by a document sheet feeder and stopped thereat, an optical system under the platen glass is moved to read an image of the document sheet, the read image of the document sheet is copied onto a record sheet and the document sheet is ejected from the platen glass. Such a digital copying machine is provided with a memory for storing image data representing the read image of the document sheet and image data outputted from a computer so that the image data stored in the memory is sequentially read to make records.

In order to improve a record processing speed of such a copying machine, moving read in which the document sheet is moved is preferred to stationary read in which an optical system is reciprocally moved.

However, the amount of data compressed by the compression method described above is not known until the compression is completed, so that when the memory becomes full during the moving read of the document sheet, the document sheet being read at that moment and the subsequent document sheet will be moved past the read station, and hence it is necessary to stop the operation of the apparatus and return by a user the document sheet which were moved past the read station without being copied to a feed unit of the document sheet feed unit. On the other hand, if the document sheet feed is constantly controlled to read the next document sheet after the completion of the output of one sheet of image data from the memory, the high speed operation cannot be attained and the productivity is lowered.

SUMMARY OF THE INVENTION

It is an object of the present invention to execute the reading of an image of a document sheet at a high speed and reliably.

It is another object of the present invention to execute the continuous reading of a plurality of sheets of document efficiently without loss and break of the read image data.

It is still another of the present invention to execute the image processing for a plurality of sheets of document image efficiently and reliably.

In accordance with the present invention, there is provided an image processing apparatus comprising read means for reading a document sheet to generate image data, data compression means for compressing the image data generated by said read means, prediction means for predicting data amount after the compression for the image data to be compressed by said data compression means, and control means for controlling the reading of the document sheet by said read means in accordance with the prediction result by said prediction means.

In accordance with another aspect of the present invention, there is provided an image processing method for controlling a read unit for reading a document sheet to generate image data comprising the steps of predicting data amount after the compression of the image data generated by said read unit and controlling the reading of the document sheet by said read unit in accordance with the predicted data amount.

In accordance with a further aspect of the present invention, there is provided an image processing apparatus comprising stack means for stacking a plurality of document sheets, convey means for conveying the document sheets stacked in said stack means, one sheet at a time, to a read position and moving the document sheet past the read position, read means for reading the document sheet while the document sheet conveyed by said convey means is moved, past the read position, so as to output image data, first memory means capable of storing at least one page of document sheet and storing the image data outputted from said read means, image processing means for applying a predetermined image processing to the image data outputted from said first memory means, second memory means having a predetermined memory capacity for storing the image data image-processed by said image processing means, output means for outputting the image data stored in said second memory means, first detection means for detecting a capacity in said second memory means occupied by the image data when the image data stored in said first memory means is image-processed by said image processing means, second detection means for detecting a vacant capacity of said second memory means, and control means for controlling said convey means to feed the document sheets at a first document sheet interval when the occupied capacity detected by said first detection means is smaller than the vacant capacity detected by said second detection means, and feed the document sheets at a second document sheet interval larger than the first document sheet interval when the occupied capacity detected by said first detection means exceeds the vacant capacity detected by said second detection means.

The above and other objects and effects of the present invention will be apparent from the following description of the invention.

BRIEF DESCRIPTION OF THE DRAWINGS

FIG. 15 shows a block diagram of a configuration of a print buffer memory (PBM) in the image processing apparatus shown in FIG. 8, FIGS. 16A and 16B show movement of a job in the print buffer memory, FIG. 38 shows a file allocation table for the printer buffer memory.

DETAILED DESCRIPTION OF THE EMBODIMENTS

Figure 1:
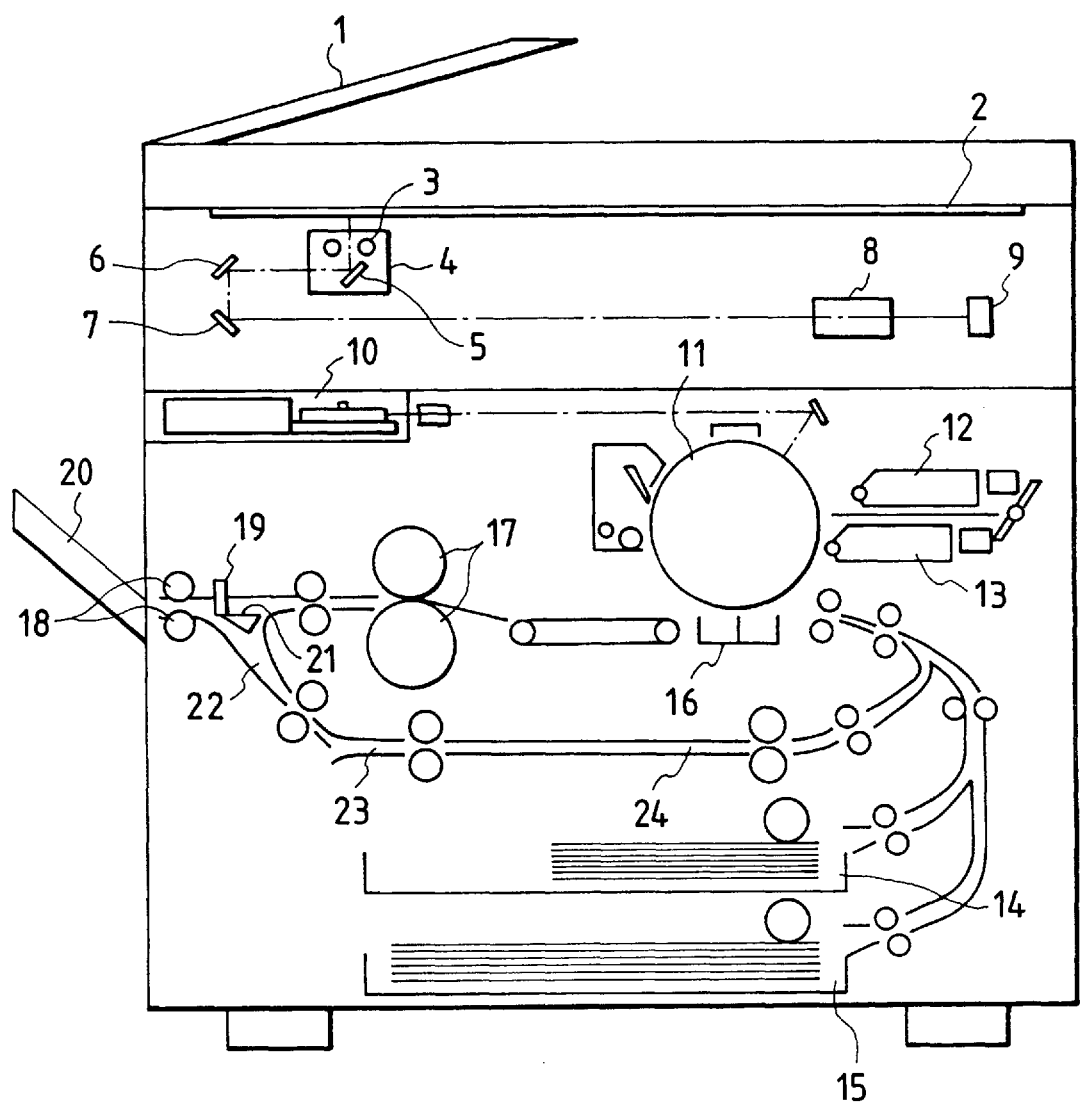
FIG. 1 shows a sectional view of a construction of an image processing apparatus in a first embodiment of the present invention.

FIG. 1 shows a sectional view of a construction of an image copying apparatus in accordance with one embodiment of the present invention.

In FIG. 1, numeral 1 denotes a document sheet feed unit for feeding a document sheet, which feeds mounted document sheets, one at a time or two sheets continuously, to a predetermined position onto a document sheet table glass 2. Numeral 4 denotes an image scanner comprising a lamp 3 and a scanning mirror 5. When a document sheet is mounted on the document sheet table glass 2 by the document sheet feed unit 1, it reciprocally scans in a predetermined manner. A reflected light from the document sheet is focused to an image sensor unit 9 having RGB color decomposing filters through scanning mirrors 5 to 7 and a lens 8.

Numeral 10 denotes an exposure control unit comprising a laser scanner. It irradiates a light beam modulated in accordance with the image data outputted from an image signal control unit 1023 (see FIG. 2) of a controller unit CONT, to a photo-conductor (photo-sensitive member) 11. Numerals 12 and 13 denote developing unit which visualize an electrostatic latent image formed on the photo-conductor 11 by developing agents (toners) of predetermined colors. Numerals 14 and 15 denotes transfer sheet stackers on which record sheets of predetermined size such as transfer sheets are stacked and accommodated. The transfer sheet is fed by the drive of a feed roller to a registration position where an image leading edge registration with the image formed on the photo-conductor 11 adjusted and the sheet is then fed.

Numeral 16 denotes a transfer/separation charger which transfers the toner image developed on the photo-conductor 11 to the transfer sheet and separates it from the photo-conductor 11. The transfer sheet is fed to a fixing unit 17 by a conveyor belt and fixed thereby. Numeral 18 denotes a sheet ejection unit which ejects the transfer sheet for which the image formation has been completed to a tray 20. Numeral 21 denotes a direction flapper which switches the feed direction of the transfer sheet for which the image formation has been completed between the direction toward an ejection port and the direction to an internal feed path to be ready for the multi/dual sides image formation process.

The image formation to a record sheet is now explained. An image signal inputted to the image sensor unit 9, that is, an input signal from an image reader control unit 1022 to be described later is processed by the image signal control unit 1023 which is controlled by a CPU circuit unit 1025 and passed to a printer control unit 1024. The signal inputted to the printer control unit 1024 is converted to an optical signal by the exposure control unit 10 to irradiate the photo-conductor 11 in accordance with the image signal. A latent image formed on the photo-conductor 11 by the irradiated light is visualized by the developing unit 12 or 13. In synchronism with the formation of the latent image, the transfer sheet is fed from the transfer sheet stacker unit 14 or 15 and the developed image is transferred in the transfer unit 16. The transferred image is fixed to the transfer sheet by the fixing unit 17 and then the transfer sheet is ejected out of the apparatus by the sheet ejection unit 18.

In the dual sides recording mode, after the transfer sheet has passed an ejection sheet sensor 19, the ejection roller 18 is rotated in the opposite direction to the sheet feed direction. Simultaneously therewith, the flapper 21 is lifted upward to accommodate the transfer sheet for which the transfer has been completed to an intermediate tray 24 through feed paths 22 and 23. In the following rear side recording, the transfer sheet accommodated in the intermediate tray 24 is fed to conduct the transfer to the rear side.

In the multi-recording mode, the flapper 21 is lifted upward to accommodate the transfer sheets for which the transfer has been completed to the intermediate tray 24 through the feed paths 22 and 23 in the following multi-recording, the transfer sheets accommodated in the intermediate tray 24 are fed to conduct the multi-transfer.

Figure 2:
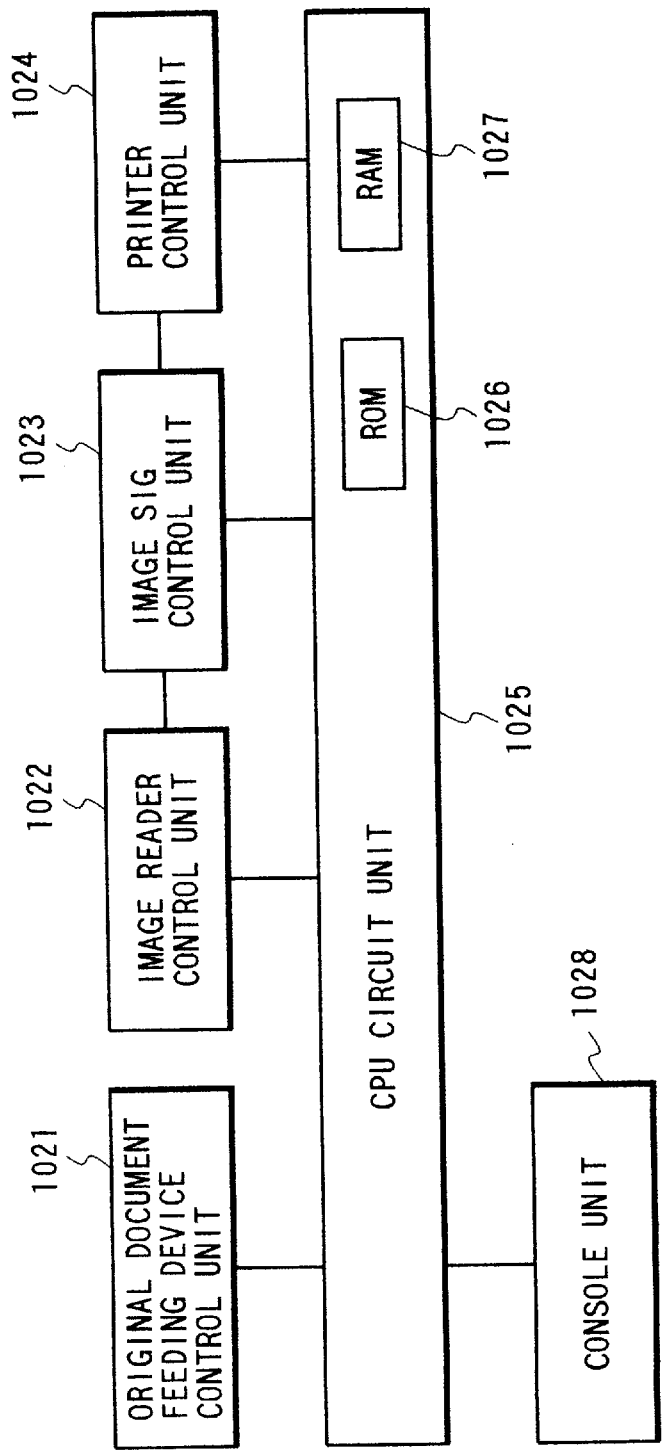
FIG. 2 shows a block diagram illustrating a configuration of a controller unit CONT of FIG. 1.

FIG. 2 shows a block diagram illustrating a configuration of the controller unit CONT which controls the overall image processing apparatus. Numeral 1025 denotes a CPU circuit unit which includes a ROM 1026 and a RAM 1027 and centrally controls the respective units in accordance with a control program stored in the ROM 1026.

Numeral 1021 denotes a document sheet feeding device control unit which controls to feed the document sheets mounted on the document sheet feed unit to the document sheet table glass 2, one sheet at a time or two sheets continuously.

Numeral 1022 denotes an image reader control unit which comprises the image sensor unit 9 described above and outputs the analog signal representing the document sheet image which has been color-decomposed by the RGB color decomposition filter and photo-electrically converted, to the image control unit 1023. Numeral 1024 denotes a printer control unit which drives the exposure control unit 10 in accordance with a video signal outputted from the image signal control unit 1023 and irradiates a light beam to the photo-conductor 11. Numeral 1028 denotes a console unit which is provided with keys for setting modes required for the image formation and a console panel having a display.

Figure 3:
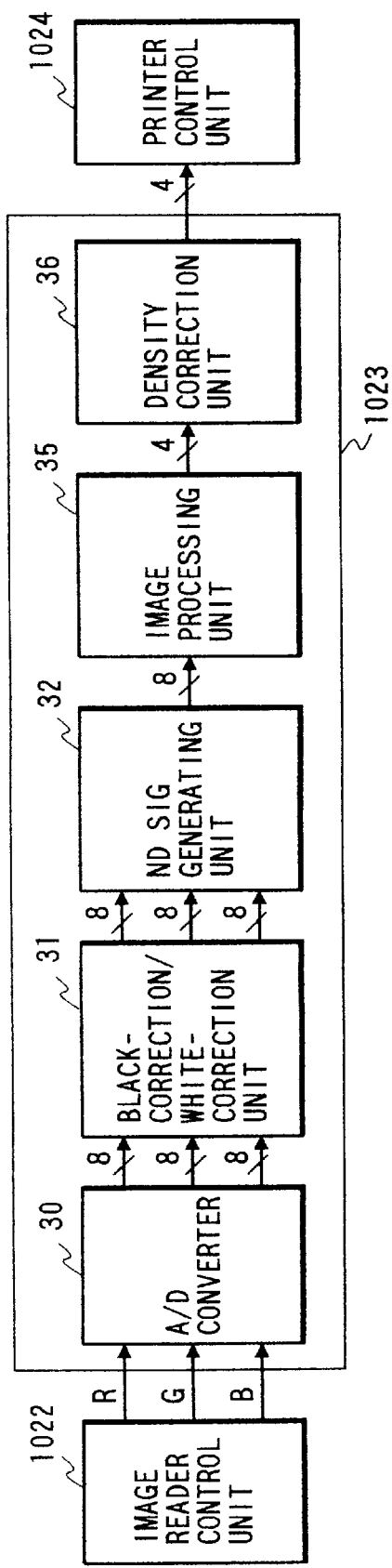
FIG. 3 shows details of an image signal control unit of FIG. 2.

FIG. 3 shows details of the image signal control unit 1023 of the present embodiment.

In FIG. 3, the RGB analog image signals outputted from the image reader control unit 1022 are converted to 8-bit digital signals, respectively, by an A/D converter 30.

Then, black level correction and white level correction (shading correction) are applied by a black correction/white correction unit 31 and the RGB signals are inputted to an ND signal generation unit 32.

The ND signal generation unit 32 sums the RGB signals and divides the sum by three to output a brilliance (or brightness) signal Dout.

$$Dout=(Rin+Gin+Bin)/3$$

The brilliance signal Dout is inputted to an image processing unit 35.

The image processing unit 35 conducts variable magnification process to magnify/reduce an image, intermediate process such as error dispersion (error diffusion) or screen processing, compression process for reduction of data amount, storage process, decompression process, and combination process of two images.

Then, in a density correction unit 36, brilliance-density conversion is conducted and the density correction ($\gamma$-correction) is conducted. The result is sent to the printer control unit 1024 of the laser beam printer.

Figure 4:
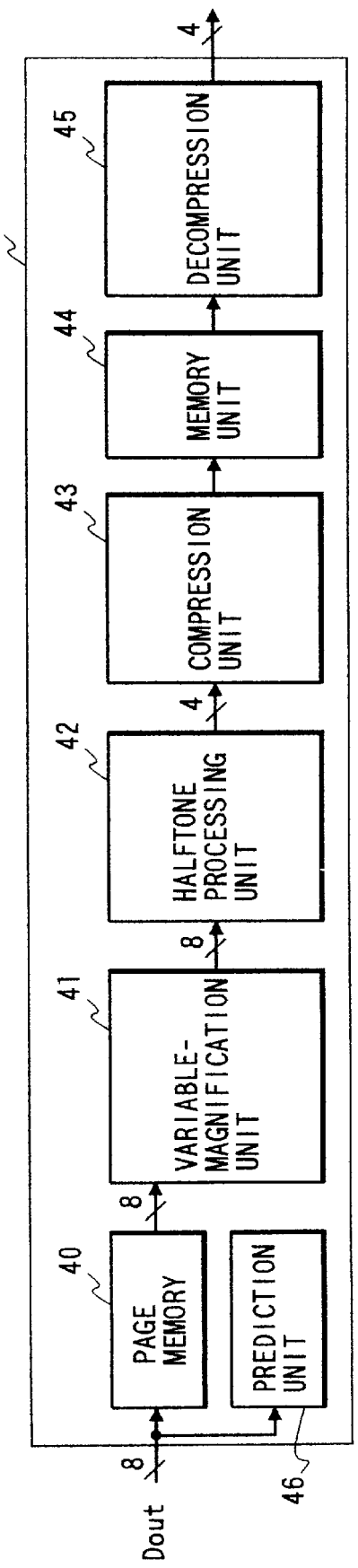
FIG. 4 shows details of an image processing unit of FIG. 3, FIGS. 5 to 7 show operation flows of compression factor prediction.

Referring to FIG. 4, configuration and operation of the image processing unit 35 are explained.

The signal Dout from the ND signal reproduction unit is stored in a page memory 40.

In a variable magnification unit 41, the variable magnification process is conducted in accordance with a command from the console unit 1028. In the variable magnification process, the magnification is attained by linear interpolation and the reduction is attained by thinning.

In a half-tone processing unit 42, quasi-half-tone processing (error dispersion system or screen system) commanded by the console unit 1028 is conducted so that the 8-bit image signals are converted to 4-bit signals.

In a compression unit 43, the compression is conducted for each bit plane by a compression method such as MH-coding or Q-Coder. The compression is conducted page by page. The compression unit 43 has a function to inform the amount of data after the compression to the CPU circuit unit 1025.

A memory unit 44 can store a plurality of pages of the compressed data from the compression unit 43 and it can conduct the editing of pages such as rearranging of the page sequence or deletion of the pages in accordance with the command from the console unit 1028. The memory unit 44 also has a function to inform a remaining memory capacity to the CPU circuit unit 1025.

A decompression unit 45 serially develops the compressed data from the memory 44 into pixel-by-pixel image data. After the development is completed and the printing of the preset number of sheets has been completed by the printer, the compressed data in the memory is erased from the memory. The erasure may be cancelled by the setting in the console unit 1028.

One page of the image data which is same as that inputted to the page memory unit 40 is inputted to a prediction unit 46. The prediction is calculated based on a mean value of all pixels in one page. After the mean value has been calculated, it is multiplied with a predetermined multiplier and a constant is added to the product to determine a prediction value of the amount of data after the compression. The multiplier and the constant are stored in the RAM 1027 of the CPU circuit unit 1025 as an experimentally determined table and it is prepared one for each of the combinations of magnification factors and types of half-tone processing.

For example, when the magnification factor is 100% (unity magnification) and the type of half-tone processing is the error dispersion method and when the multiplier and the constant are selected to 0.01 and 0.1, respectively, assuming that the mean value of total number of pixels in one page is 40, the prediction value of the compression factor is given by $$40 \times 0.01 + 0.1 = 0.5$$

Namely, the amount of data after the compression is predicted to be ½ of the image data before the compression.

Figure 5:
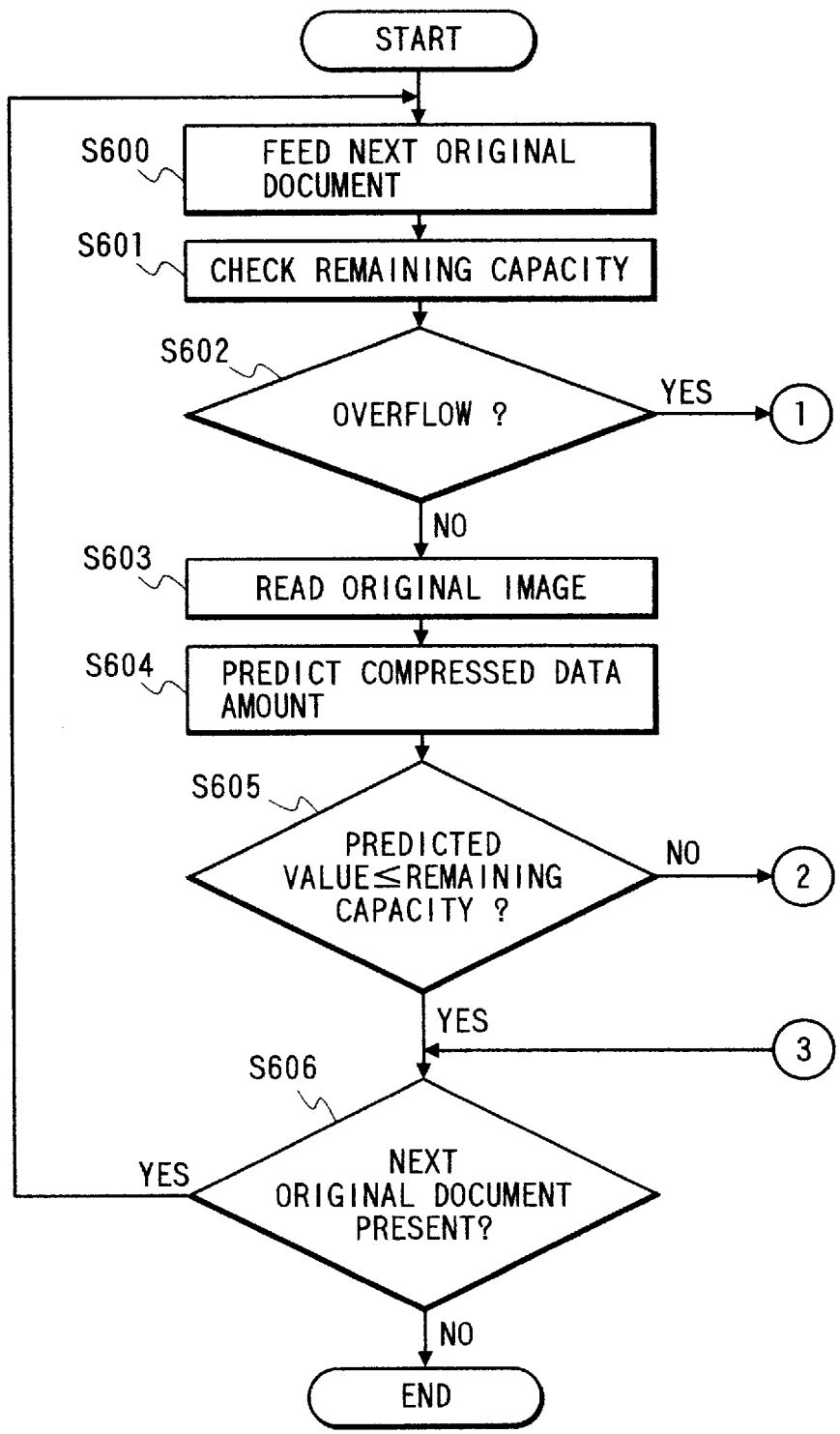
Figure 6:
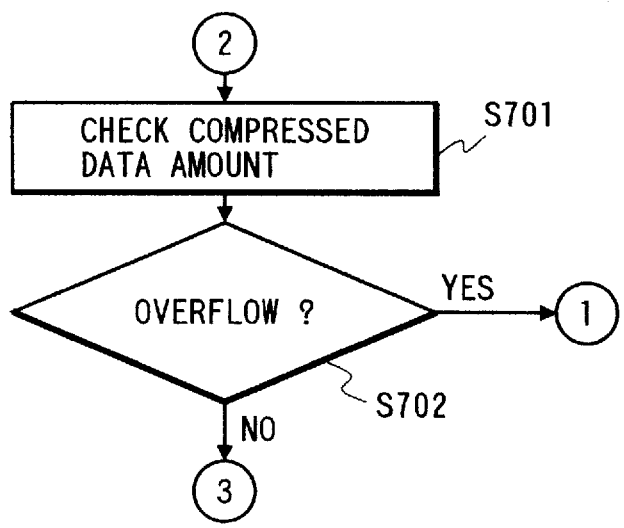
Figure 7:
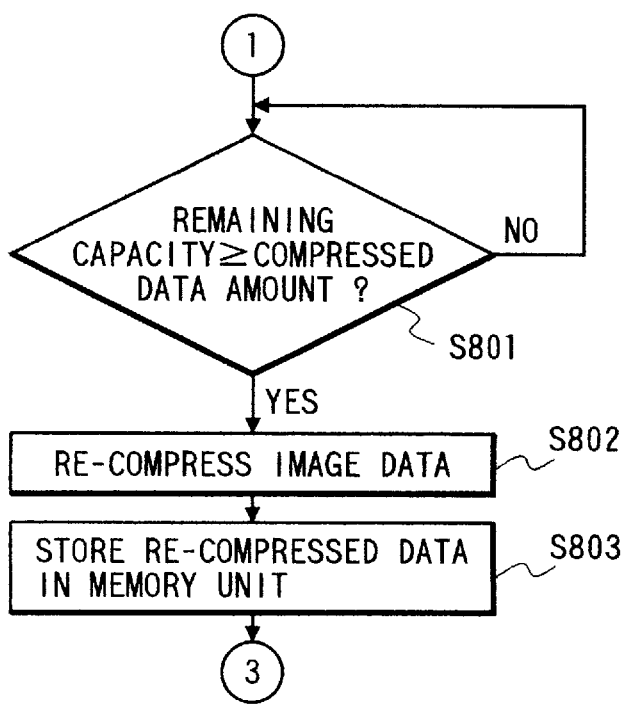

Referring to FIGS. 5, 6 and 7, the overall operation by the control of the CPU circuit unit 1025 is explained.

In S600, the sheet feed is commanded to the document sheet feed unit control unit 1021 to feed a first document sheet from the document sheet feed unit 1 to the document sheet table 2.

In S601, the remaining memory capacity of the memory unit 44 is checked. In S602, whether the previous document sheet is not stored because of the overflow of the memory unit 44 is determined. If it is not stored, the previous document sheet need be again compressed and stored and the process shifts to S801. If it is stored, the process proceeds to S603 to read the next document sheet which has been set in the document sheet table 2 and the image data is stored in the page memory 40.

The image data stored in the page memory 40 is sequentially read and sent to the variable magnification processing unit 41 and the half-tone processing unit 42 and then compressed by the compression unit 43.

In S604, in parallel with the read operation of the document sheet, the prediction value of the amount of data after the compression of the read document sheet is calculated by the prediction unit 46. The prediction is conducted prior to the completion of the actual compression operation by the compression unit 43. In S605, if the prediction value is smaller than the remaining memory capacity of the memory unit 44, the process proceeds to S606, otherwise the process proceeds to S701.

When the presence of the next document sheet is detected in S606, the process proceeds to S600 to control the document sheet feed unit 1 by the document sheet feed unit control unit 1021 to feed the next document sheet onto the document sheet table 2 and the above operation is repeated again.

On the other hand, when it is determined in S605 that the prediction value by the prediction unit 46 exceeds the remaining memory capacity of the memory unit 44, the actual compressed data amount is checked in S701 based on the compression result conducted by the compression unit 43 in parallel with the prediction. In S702, whether the memory unit 44 overflows or not is determined, and if it overflows, the next document sheet is not fed or read and the process proceeds to S801. If it does not overflow, the process proceeds to S606.

When the memory unit 44 overflows, the process waits in S801 until the remaining memory capacity of the memory unit 44 exceeds the compressed data amount, and when it exceeds, the same image data is read again from the page memory unit 40 in S802 and the image data passed through the half-tone processing unit 42 is compressed, it is stored in the memory unit 44 in S803 and the process proceeds to S606. When the presence of the next document sheet is detected, the process proceeds to S600 to control the document sheet feed unit to feed the next document sheet.

In the present embodiment, the configuration with the page memory has been described. When the page memory is not provided, the same document sheet may be read again by the image scanner 4 to attain the same operation as that of the above embodiment.

In the present embodiment, the mean value of the image data is used to predict the compression factor although an entropy which the image data possesses or other parameter may be used.

The entropy has been proved to be a parameter which exhibits a limit of the compression factor and the correlation with the actual compression factor is very high. Thus, when it is applied to the present embodiment, the effect is very high.

As described above, the image processing apparatus of the present embodiment comprises the image scanner 4 for serially reading the document sheet fed by the document sheet feed unit 1, the compression unit 43 for compressing the image data, the memory unit 44 for storing the compressed data and the prediction unit 46 for predicting the compressed data amount in the compression unit 43 in the method different from the compression method provided in the compression unit 43 faster than the compression by the compression unit 43. The apparatus controls the reading of the document sheet on the basis of the amount of occupation of the memory unit 44 and the data amount predicted by the prediction unit 43. Thus, when the document sheets are sequentially read by using the document feeder, the feeding and the reading of the next document sheet can be controlled prior to the completion of the compression, so that the high efficiency reading and compression are attained.

Further, the page memory for storing the read document sheet is provided and when the compressed data is not stored, the data may be retransmitted from the page memory to the compression unit 43. Thus, the image data stored in the page memory can be retransmitted even when the storing is not conducted after the completion of the compression and the re-reading of the document sheet is not necessary and the throughput is improved.

In this manner, the compressed data amount is predicted and the high efficiency image reading is attained in accordance with the prediction result.

Another embodiment which applies the present invention to an apparatus in which a document sheet is moved at a high speed and an image of the document sheet under movement is read.

Figure 8:
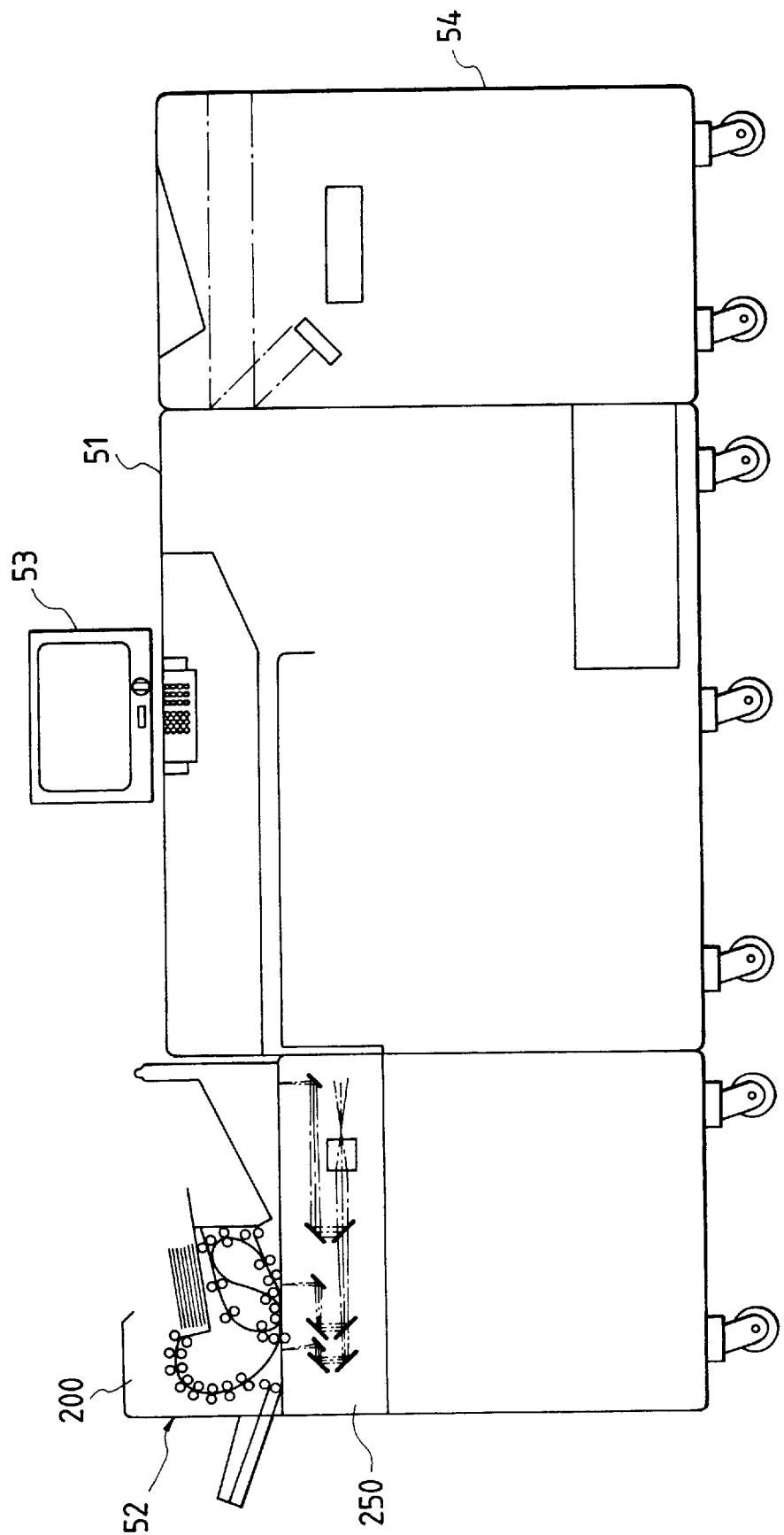
FIG. 8 shows a side view of a construction of an image processing apparatus having an image memory unit in accordance with another embodiment of the present invention.

This embodiment of the present invention is now explained with reference to the drawings. FIG. 8 shows a side view of a construction of an image processing apparatus (copying machine) of the present embodiment. In FIG. 8, numeral 51 denotes an image recording unit (hereinafter referred to as a printer unit), numeral 52 denotes an image read unit (hereinafter referred to as a reader unit), numeral 53 denotes a control unit (hereinafter referred to as an operator control unit (OCU)) and numeral 54 denotes a finishing unit.

The reader unit 52 comprises an automatic document sheet feeder unit (hereinafter referred to as an ADF) 200 for automatically feeding the document sheet to a read position and a scanner unit 250 for optically reading the document sheet image. A specific operation of the reader unit 52 will be explained with reference to FIG. 9. The printer unit 51 visualizes the image read by the reader unit 52 or the image sent from a computer terminal or an external equipment (not shown) such as a facsimile machine to print on a record sheet such as a transfer sheet. The printer unit 51 is provided with a large capacity print buffer memory (hereinafter referred to as a PBM) 65 as shown in FIG. 15 to store the image inputted from the ADF 200 or the external equipment and conduct the sorting process such as the rearrangement of pages after the storing. A specific operation of the printer unit 51 will also be described later.

The OCU 53 comprises a display and a keyboard (or a touch panel type display) to enter various settings by a user such as number of sheets setting, number of sets setting, edition of image and processing of image and display information representing the selected mode and status of the apparatus. The finishing unit 54 post-processes the output sheet obtained by having recorded on the record medium in the printer unit 51 and conducts the sorting, stapling or bookbinding.

A basic operation in the image processing apparatus of the configuration shown in FIG. 8 is now explained. When the user sets a plurality of document sheets on the ADF 200 of the reader unit 5, sets the mode of the OCU 53 and designates the start of copying, the ADF 200 feeds the document sheets one by one and the images thereof are read by the scanner unit 250. The scanner unit 250 photo-electrically converts the reflected light 110 from the exposed document sheet by a CCD line sensor 111 (see FIG. 9) to read it as an electrical signal. The read image signal is processed in various manners by an image processing unit 61 to be described later and it is compressed and transferred to the PBM 65 of the printer unit 51. The printer unit 51 sequentially reads the images from the PBM 65 in accordance with the user setting from the OCU 53 and the read image is converted to an optical signal for the exposure of the photo-conductor.

Then, the conventional electro-photographic processes, that is, charging, exposing, latent image forming, developing, transferring, separation and fixing are conducted and the image is recorded on the record medium.

The basic operation in the image processing apparatus of FIG. 8 has thus been described.

Figure 9:
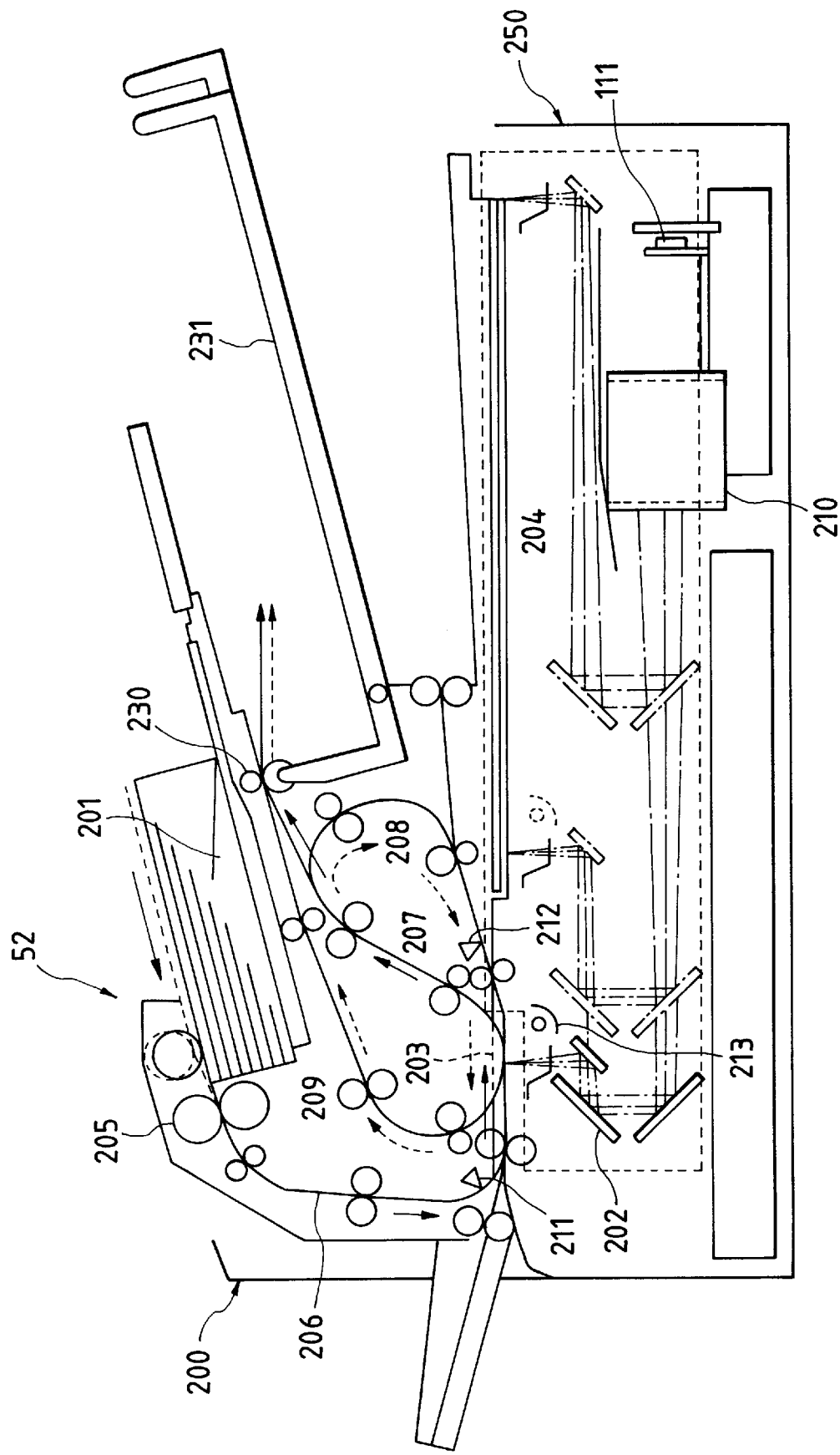
FIG. 9 shows a longitudinal side view of a construction of an automatic document sheet feed unit in the above image processing apparatus.

Referring now to FIG. 9, a basic operation of the ADF 200 is explained. FIG. 9 shows a longitudinal sectional view of a construction of the ADF 200 and the scanner unit 250 described above. In FIG. 9, numeral 201 denotes a document sheet tray for stacking document sheets, numeral 202 denotes a first mirror for directing a reflected light from the document sheet to the CCD 111, numeral 203 denotes a moving read document sheet read position, numeral 204 denotes a book mode scan read position, numeral 205 denotes a sheet feed unit, numeral 206 denotes a feed path to the moving read document sheet read position 203, numeral 207 denotes a feed path to eject a one-side document sheet read at the moving read document sheet read position 203, numeral 208 denotes a feed path to feed a rear side of the document sheet read in the moving read document sheet read position 203 to the moving read document sheet read position 203 and numeral 209 denotes a feed path to eject the document sheet after the rear side thereof is read in the moving read document sheet read position 203.

The moving read document sheet reading is the system in which the document sheet fed from the document sheet tray 201 is moved past the moving read document sheet read position 203 while the mirror 202 is fixed at the moving read document sheet read position 203 to scan the image. The document sheet is fed along the arrow marked on the feed path. When the rear side of the document sheet is read, it is read as a mirror image to the image read from the front side of the document sheet. A process to correct the mirror image to a real image will be described in connection with an image processing unit 61. In the drawing, the solid line arrow indicates the feed direction of the moving read of the one-side document sheet and the broken line arrow indicates the feed direction of the moving read of the dual-side document sheet.

Contrarily to the moving read document sheet read system, the book mode scan is the system in which the scan is made while the optical system such as the mirror 202 and a lamp 213 is moved without moving the document sheet mounted on the book mode scan read position 204.

In any system, the read unit is moved relative to the document sheet to scan the document sheet.

The reflected light by the exposure to the document sheet passes through a lens 210 and is projected to the CCD line sensor (hereinafter referred to as a CCD) 111 and it is photo-electrically converted. In the construction shown in FIG. 9, for the longitudinal feed (portrait feed), the feed path 206 has a length to accommodate two A4-size document sheets. For the longitudinal feed (portrait feed) along a short side of the document sheet, the feed path 208 has a length to accommodate two A4-size document sheets. For the lateral feed (landscape feed) to feed the document sheet along a long side, the feed paths 206 and 208 have a length to accommodate one A3-size document sheet.

The document sheet mounted on the feed tray 201 are in a face-up leading-page process in which the document sheet front side faces up and the leading page is stacked at the top. In the one-side moving read, the document sheets are sequentially read along the solid line arrow, and in the dual-side moving read, the half-size document sheets (A4 longitudinal, B5 longitudinal, A5 longitudinal) assume a different sheet feed sequence. The half-size documents are fed two sheets at a time and the rear side reading is conducted through the feed path 208 for the two document sheets read at the moving read document sheet read position 203. Simultaneously with the completion of the reading of the two document sheets of the rear-side reading, the reading of the front sides of the next two document sheets is started. Namely, the reading is conducted in the sequence of the front side of the first document sheet, the front side of the second document sheet, the rear side of the first document sheet, the rear side of the second document sheet, the front side of the third document sheet, the front side of the fourth document sheet, the rear side of the third document sheet, . . . .

Figure 10:
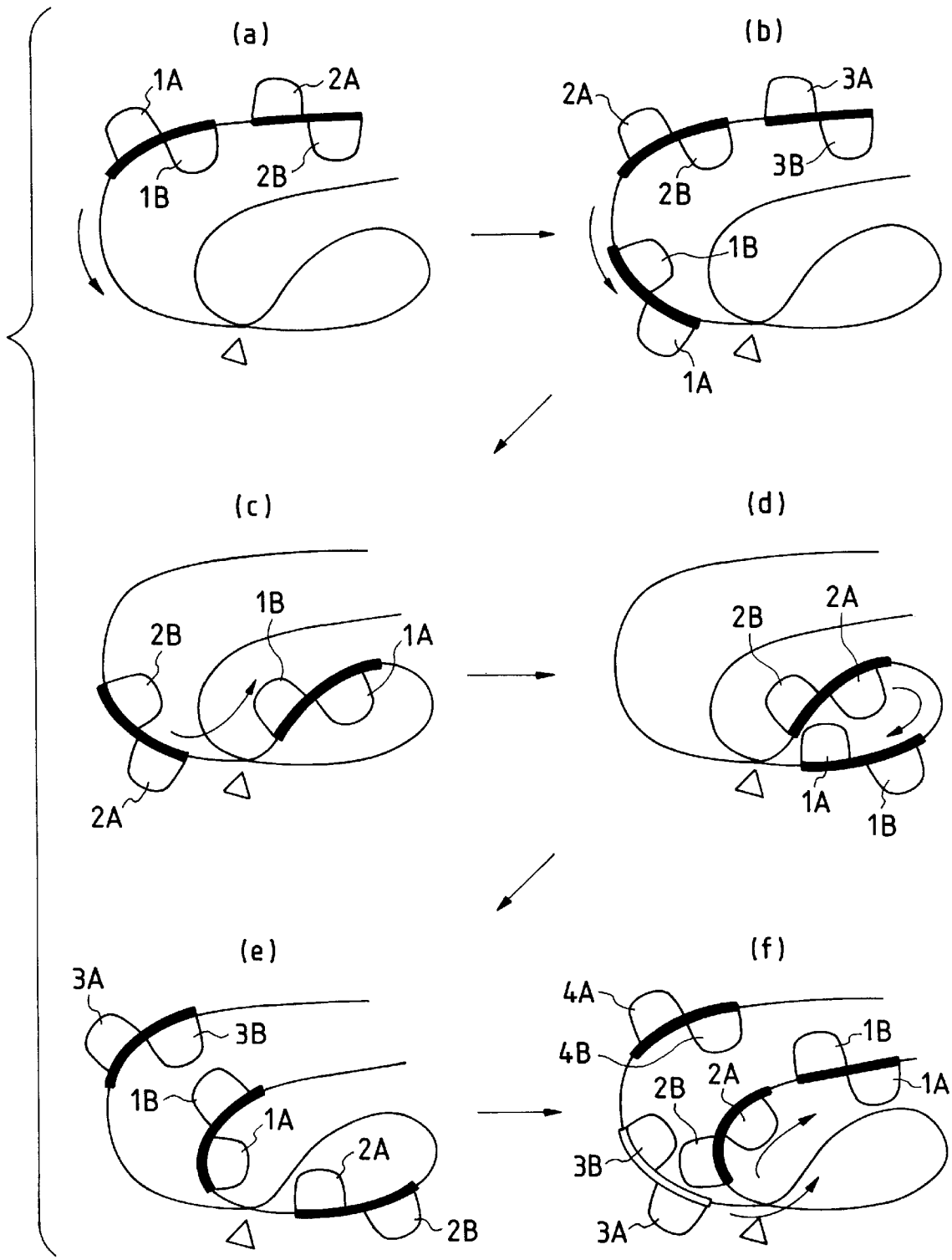
FIGS. 10a–10f illustrate a document sheet feed operation of the automatic document sheet feed unit, FIG. 11 which is composed of FIGS. 11A and 11B shows a block diagram of an internal configuration of the image processing apparatus shown in FIG. 8, FIGS. 12 to 14 show examples of image processing in the image processing apparatus shown in FIG. 8.

The dual-side document sheet read operation is shown in FIG. 10. In FIG. 10, numerals 1A and 2A denote the document sheet images of the front side of the first and the front side of the second, respectively, numerals 1B and 2B denote document sheet images of the rear side of the first and the rear side of the second, respectively, numerals 3A and 4A denote document sheet images of the front side of the third and the front side of the fourth, respectively, and numerals 3B and 4B denote document sheet images of the rear side of third and the rear side of the fourth, respectively.

In the ADF 200 shown in FIG. 9, a non-circulation type document sheet feed unit is used in which the document sheet mounted on the document sheet tray 201 is not returned to the document sheet tray 201 but returned to a return tray 231. The sheet feed unit 205 and the feed paths 206, 207, 208 and 209 shown in FIG. 9 assume an independently driven construction so that they may be individually driven, stopped and speed-controlled. The document sheet feed in the ADF 200 is controlled by the controller 123 (see FIG. 11A) based on the designation from the OCU 53 and the status of the PBM (print buffer memory) 65.

In FIG. 9, numeral 211 denotes a waiting position in the feed path 206 and numeral 212 denotes a waiting position in the feed path 208. They are positions at which the document sheets are stopped in the feed paths in accordance with the status of the PBM 65 to be described later and the position control is conducted based on the sheet detection sensor pass time and the feed speed. In FIG. 9, numeral 230 denotes a feed path along which the document sheet is returned to the return tray 231.

Figures 11, 11A:
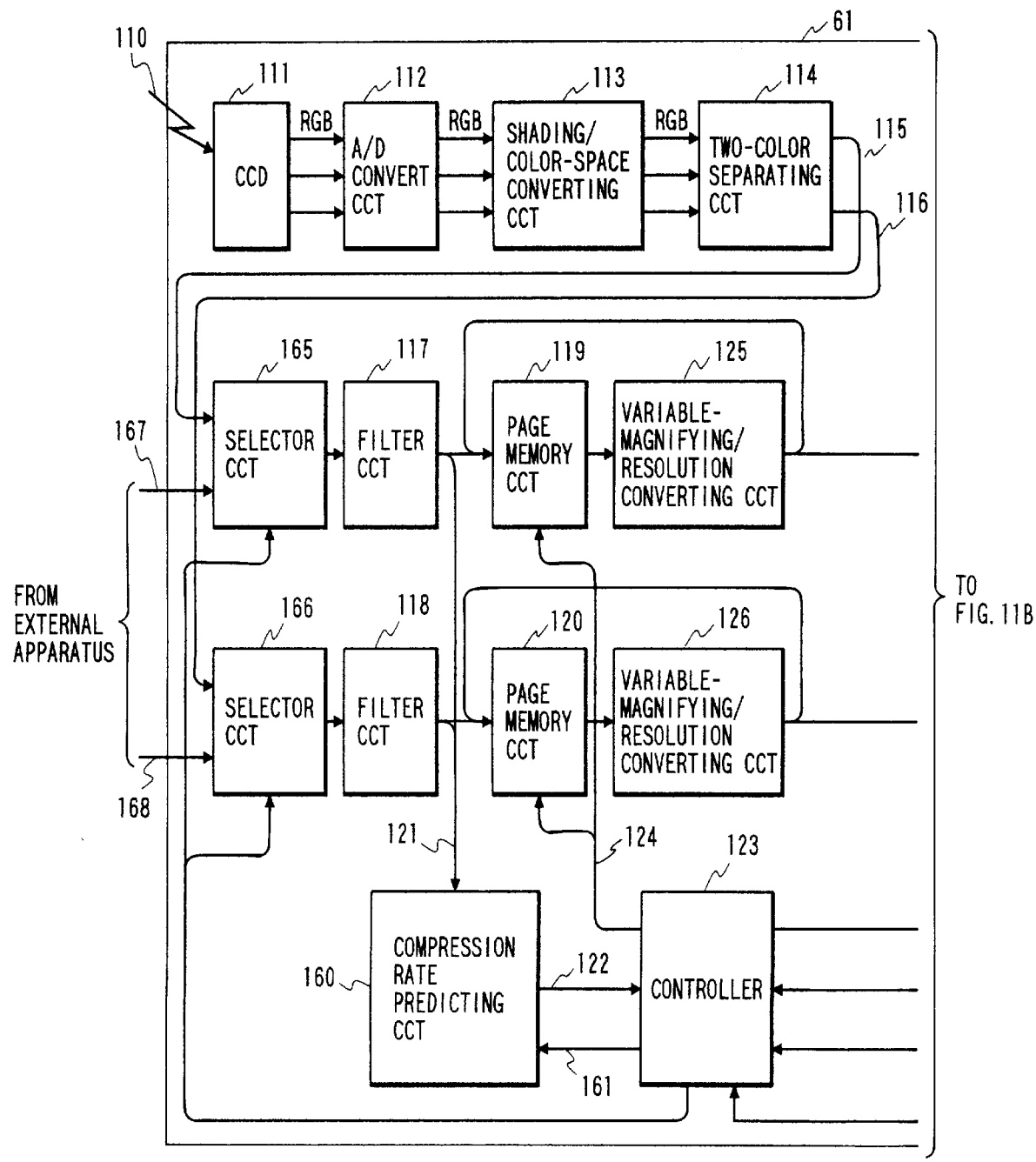
Figure 11B:
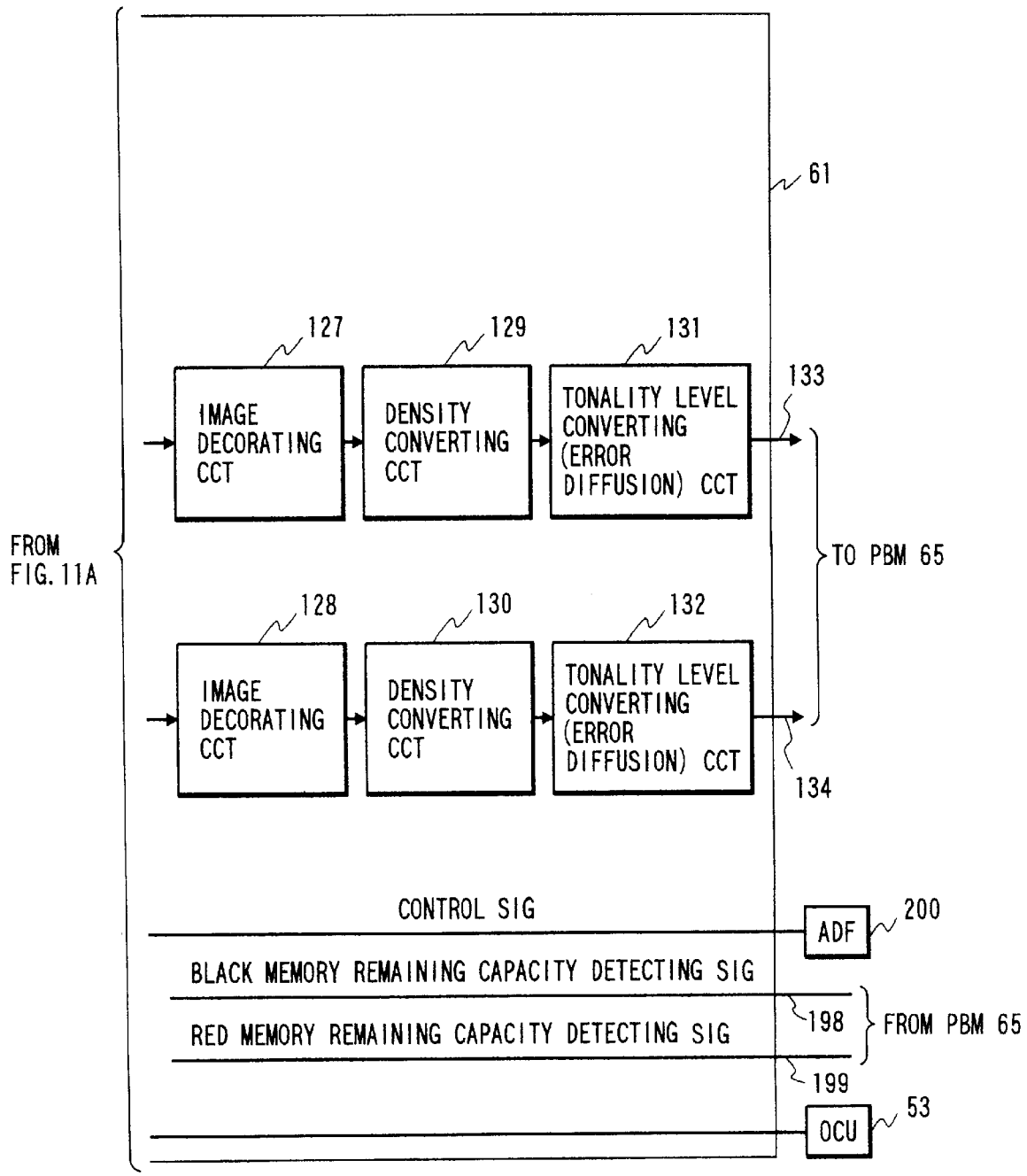

Referring to FIGS. 11A and 11B, the image processing unit 61 which conducts the image processing to the read image data is explained in detail. FIGS. 11A and 11B show a block diagram of a configuration of the image processing unit 61. In FIGS. 11A and 11B, the reflected light 111 of the document sheet reached to the document sheet read position is sensed by the CCD 111 and it is photo-electrically converted to generate RGB (red, green and blue) electrical signals. The generated image signals are amplified and then converted by an A/D (analog-to-digital) converter 112 to digital image signals. The digital RGB signals are black-corrected/white-corrected (shading-corrected) and color-corrected (masked) by a shading/color space conversion circuit 113 for normalization and standardization. The standardized RGB signals are brilliance/density converted and black/red two-color separated by a two-color separation circuit 114 to generate a black image data signal 115 and a red image data signal 116.

The subsequent process is conducted by independent circuit configurations for the black image data signal and the red image data signal in parallel. Selector circuits 165 and 166 select the image data 115 and 116 inputted from the CCD 111 or the black image data signal 167 and the red image data signal 168 externally inputted from the PC. The selection is based on the setting of the OCU 53.

Figure 14:
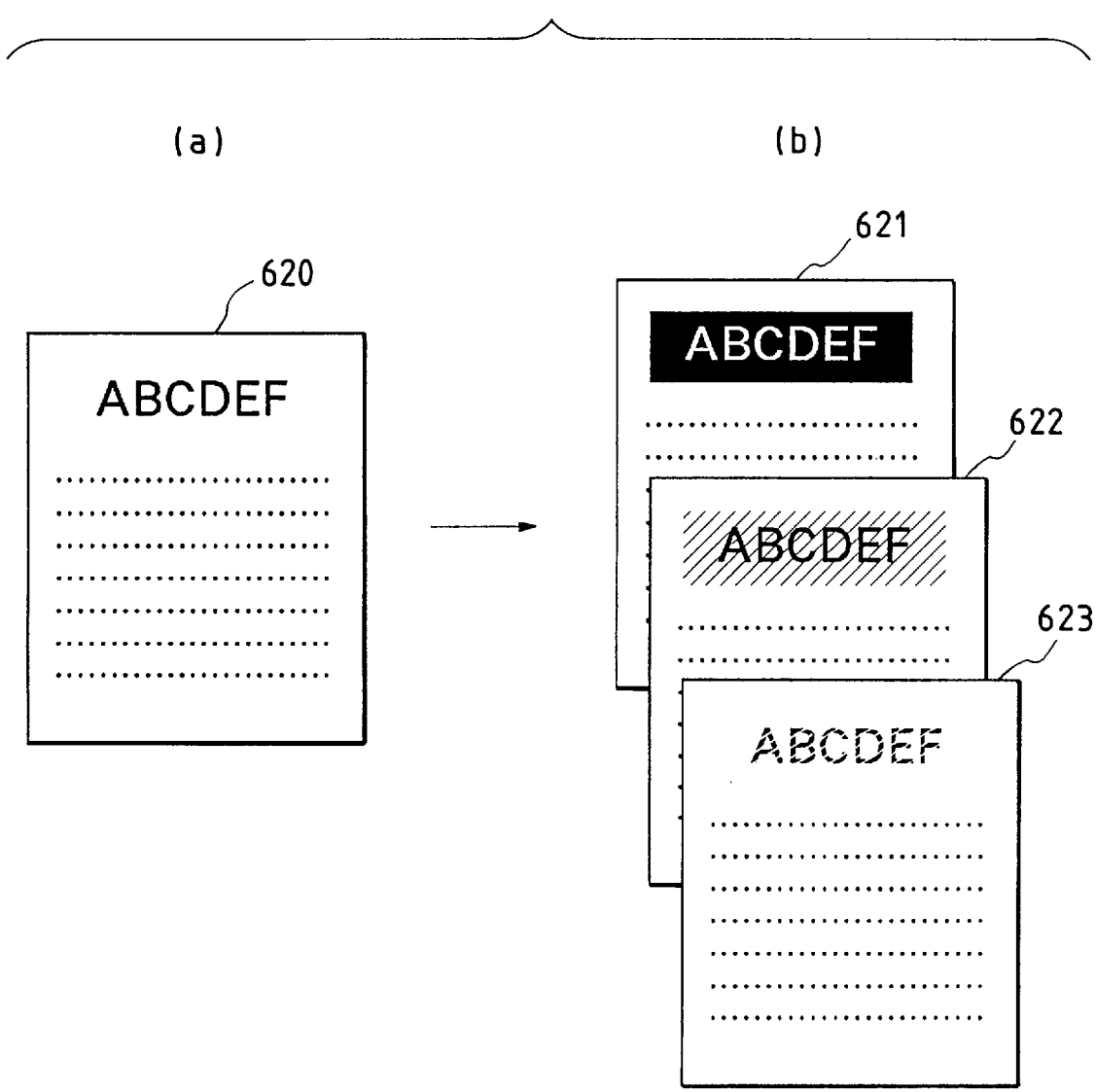

In filter circuits 117 and 118, the filtering is conducted in order to recover the reduction of MTF during the reading of the image and weaken a moare pattern generated in reading a mesh document sheet. Each of page memories 119 and 120 has a capacity to store one page of up to A3 size image. In the image read by the bidirectional document sheet feeder, the image read in the opposite direction to the forward direction is in a mirror image. The image read in the mirror image is further mirror-image processed to convert it to a real image by using the page memories 119 and 120. A process to attain a cut and paste function to move a specified area of a document sheet image 610 as shown in (a) of FIG. 12 to other area to create an image 611 as shown in (b) of FIG. 12 and a reduction layout function to reduce input document sheet images of a plurality of sheets by a factor of 50% by succeeding stage variable magnification/resolution conversion circuits 125 and 126 to form four-sheet document image 610 as shown in (a) of FIG. 13 into an image 611 on one sheet as shown in (b) of FIG. 13 are also conducted on the page memories 119 and 120 by the memory control signal 124 from the controller 123. The variable magnification/resolution conversion circuits 125 and 126 conduct the reduction layout function as well as the conventional image size conversion. Image modification circuits 127 and 128 attain the functions to form an image 621 as shown in (b) of FIG. 14 negative-positive reversed by designating an area on the document sheet image as shown in (a) of FIG. 14, a meshed image 622 and a meshed image 623 by designating an area to the document sheet image 620.

Density conversion circuits 129 and 130 conduct gamma conversion for correcting the linearity characteristic of the printer unit 51 and the process to reflect the density adjustment level inputted by the user to the image data. The image data heretofore are 8-bit 256-tone signals but tone conversion (error dispersion) circuits 131 and 132 convert them to printable 4-bit 16-tone image signals that is, black image data signal 133 and red image data signal 134. In order to cancel the irregularity in the density caused by the conversion of the number of tones when viewed for a certain area, the error due to the tone conversion is dispersed (or diffused).

The image signal processing operation conducted by the image processing unit 61 has thus been described.

The PBM (print buffer memory) 65 for storing a large number of pages of image for printing is now explained. FIG. 15 shows the block diagram of a configuration of the PBM 65. In FIG. 15, the black image data signal 133 and the red image data signal 134 inputted from the image processing unit 61 to the PBM 65 are coded by a compression process of a variable length reversible compression system of compression circuits 150 and 153. The variable length reversible system has a property that the data amount after the compression differs from input image to input image but the image which is same as the input image can be restored after the decompression process and it is compared with a fixed length non-reversible compression system such as the JPEG. The variable length reversible compression system includes MH, Q-Coder and Lempel Ziv, and any one of them may be used. DRAMs 151 and 154 form a memory unit in the PBM 65 and comprise a semiconductor memory or a hard disk and a control unit for addressing it. When page rearrangement such as a pamphlet mode (page 1 and page N are recorded on front pages and page 2 and page N-1 are recorded on rear pages thereof, and other pages are arranged in the same manner) is conducted, it is attained by controlling the addressing in the DRAMs 151 and 154. The image to be printed out is read from the DRAMs 151 and 154 and it is restored to the original image data by decompression circuits 152 and 153. The read timing for the black image data signal 135 is that required to form the black image and the read timing for the red image data signal 136 is that required to form the red image and they are read independently. The DRAMs 151 and 154 store the image data relating to all jobs. Remaining capacity detection circuits 157 and 158 detect capacities of storable area of the DRAMs 151 and 154, respectively, and output the detection results as a black memory remaining capacity detection signal 198 and a red memory remaining capacity detection signal 199. The black image data signal 135 and the red image data signal 136 are outputted to a D/A converter and a laser driver.

Figure 16A:
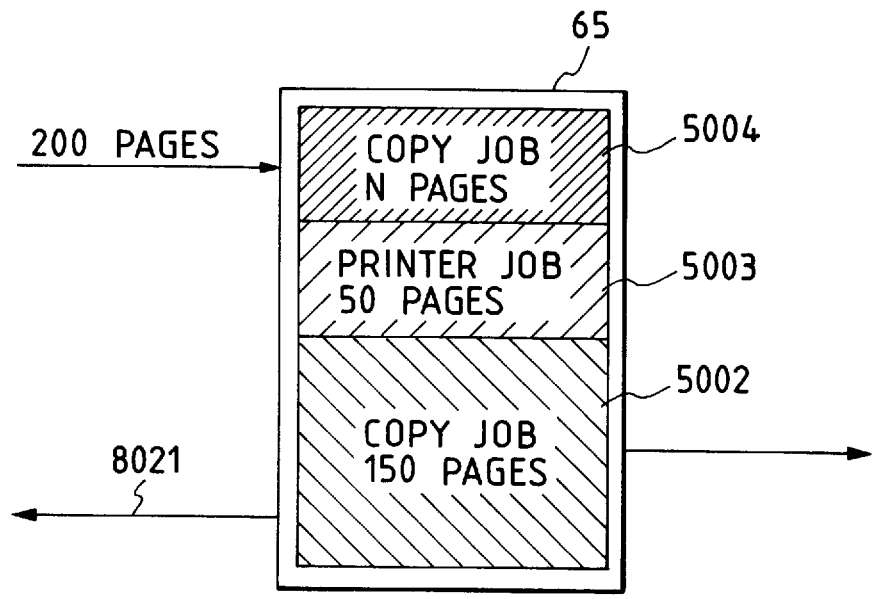
Figure 16B:
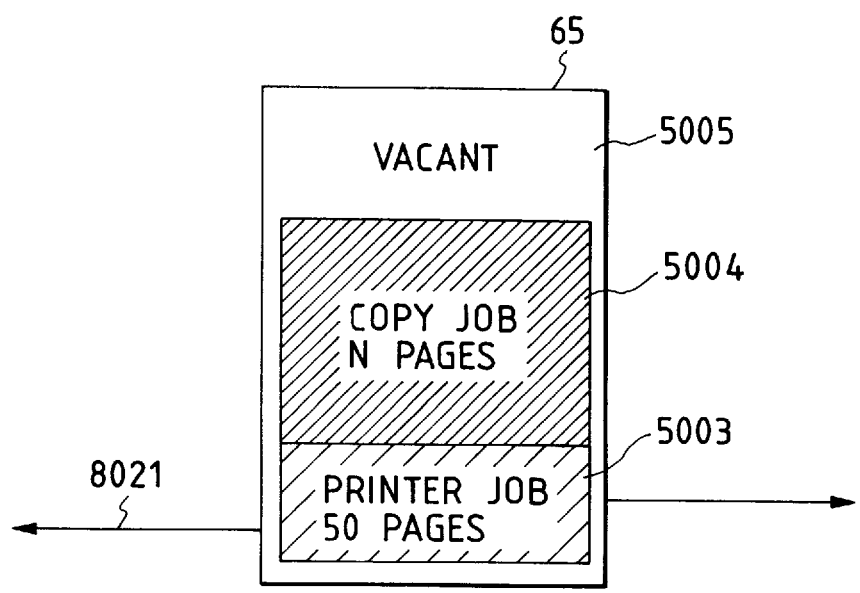

Referring to FIGS. 16A ad 16B, an operation thereof is explained. FIGS. 16A and 16B show a conceptual view of the PBM 65. In FIG. 16A, numeral 5002 denotes a copy job (to record in accordance with the image read by the CCD 111) which is being printed and copies 100 sets of 150 pages of document sheets. The pages 1 to 150 are sequentially read, but each set, for print out and then finishing process is conducted. Numeral 5003 denotes a job which is withheld as the job to be executed next and it finishes 60 sets of 50 pages by a print job (to record in accordance with the image data inputted from the PC) requested from the external equipment such as the PC. Numeral 5004 denotes a copy job of 50 sets of 200 pages. It is in the course of reading the image for 200 pages. In this case, the PBM 65 becomes full before the completion of the storing of 200 pages of image data and the read operation is temporarily interrupted. The job 5002 prints out pages 1 to 150 of the last 100th set which has been continuously read and the image for the printed-out pages is no longer need be stored and it is replaced with the image of the withheld job 5004. When the job 5002 is completed, the printing of the withheld job 5003 is started. Numeral 8021 denotes status information of the PBM.

In FIG. 16B, numeral 5005 denotes a vacant area in the PBM 15 to which other jobs may be inputted (stored) so long as the memory capacity permits.

Referring to FIG. 11, compression factor prediction is described. The image data stored in the DRAMs 151 and 154 of the PBM 65 have been compressed by the compression circuits 150 and 153 and the compression factors thereof differ depending on the image data amount, the content thereof and the process to the image data. Thus, a compression prediction circuit 160 predicts the compression factor of the image stored in the page memories 119 and 120 which is to be stored in the PBM 65 based on the modification information (meshing in (b) of FIG. 14, partial movement in FIG. 12) of the image obtained from the controller 128 through a bus 161, the magnification information (reduction layout of FIG. 13) and the operations of the selected density conversion circuits 129 and 130 and the tone conversion circuits 131 and 132. Namely, the compression factor prediction circuit 160 applies a simple arithmetic operation to the statistics of the image information (a density means value of the image or an entropy which has a high correlation with the compression factor) to determine the prediction value. The arithmetic operation or the coefficient used therefor is changed in accordance with the processing information which indicates the processes applied to the image data. For example, the density mean value of the image is used for the prediction and the following formula (1) is used to convert it to the prediction value.

$$\text{Compression factor prediction value} = \text{mean image density value} * a + b \quad (1)$$

where a and b determined in accordance with the contents of the processes of the image. By referring a RAM table, not shown, a and b are redetermined and they are transmitted to the compression factor prediction circuit 160 through the bus 161. As an example, assuming that the means density value of the image area is 40, the coefficient a for the process is 0.01 and b is 0.1, the prediction value is determined by the following formula (2).

$$\text{Compression factor prediction value} = 40 * 0.01 + 0.1 = 0.5 \quad (2)$$

This represents that the data amount after the compression is ½ of the data amount before the compression.

In this manner, the compression factor prediction circuit 160 predicts the compression factor of the image data stored in the page memories 119 and 120.

Figure 17:
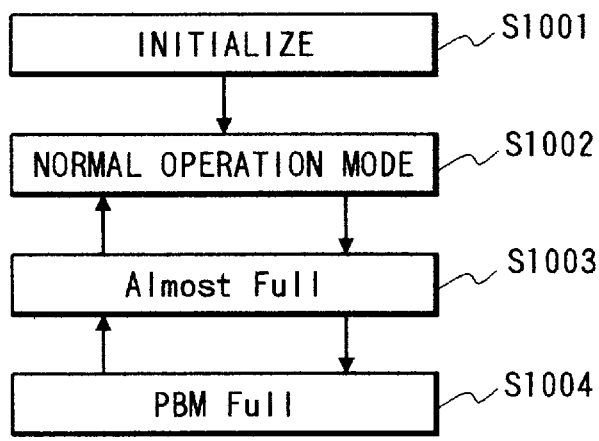
FIG. 17 shows a status transition diagram (STD) of the image processing apparatus shown in FIG. 8.

Referring to FIG. 17, an operation of the ADF 200 in the image processing apparatus of the present invention is now explained. FIG. 17 shows a STD (status transition diagram) illustrating the status of the ADF 200 in the image processing apparatus of the present embodiment. In FIG. 17, in a step S1001, a power is turned on to initialize the apparatus and the apparatus assumes the normal operation mode in a step S1002. In the normal operation mode, if it is determined that some vacant area is available but it is not sufficient to store the image data for which the compression factor has been predicted, on the basis of the remaining capacity detection signals 198 and 199 (see FIG. 15), the prediction value by the compression factor prediction circuit 160 and the image data amount, an almost full status to be described later is assumed in a step S1003. In the almost full status, if it is determined that the vacant area in the PBM 65 is exhausted based on the remaining capacity detection signals 198 and 199, a PBM full status to be described later is assumed in a step S1004. In the PBM full status, if it is determined that a vacant area is available in the PBM 65 based on the remaining capacity detection signals 198 and 199, the almost full status is assumed in the step S1003. In the almost full status, if it is determined that a room to store the image data for which the compression factor has been predicted is available based on the remaining capacity detection signals 198 and 199, the normal operation mode of the step S1002 is assumed.

Operations in the respective status are explained below.
[Normal Operation Mode]

Figure 18:
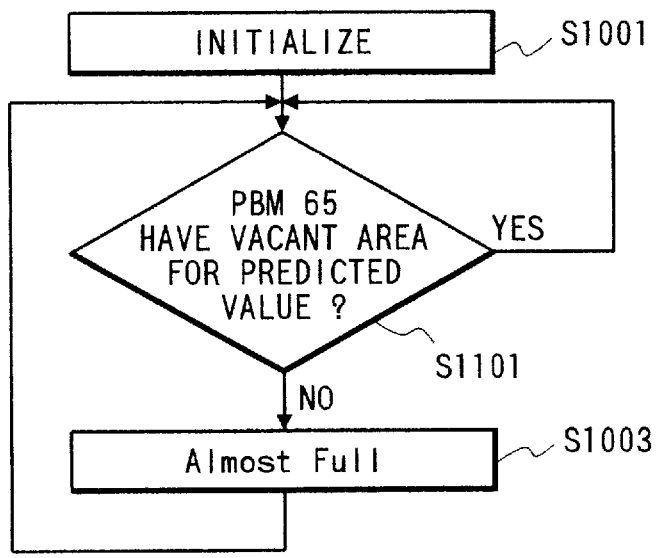
FIG. 18 shows a flow chart of an operation control process in a normal operation mode of the image processing apparatus shown in FIG. 8.

The normal operation mode is first explained with reference to a flow chart of FIG. 18. In the normal operation mode in the step S1002 in FIG. 17, whether a room to store the image data for which the compression factor has been predicted is present in the PBM 65 or not is determined in a step S1101 of FIG. 18 based on the remaining capacity detection signals 198 and 199. If there is no room, the process proceeds to the almost full mode (step S1003 of FIG. 17). If there is a room in the step S1101, the normal operation mode is maintained and the decision process of the step S1101 is again conducted. In this manner, when there is a room to store the image data for which the compression factor has been predicted in the PBM 65, the present apparatus repeatedly conducts the decision process in the step S1101.

Figure 21:
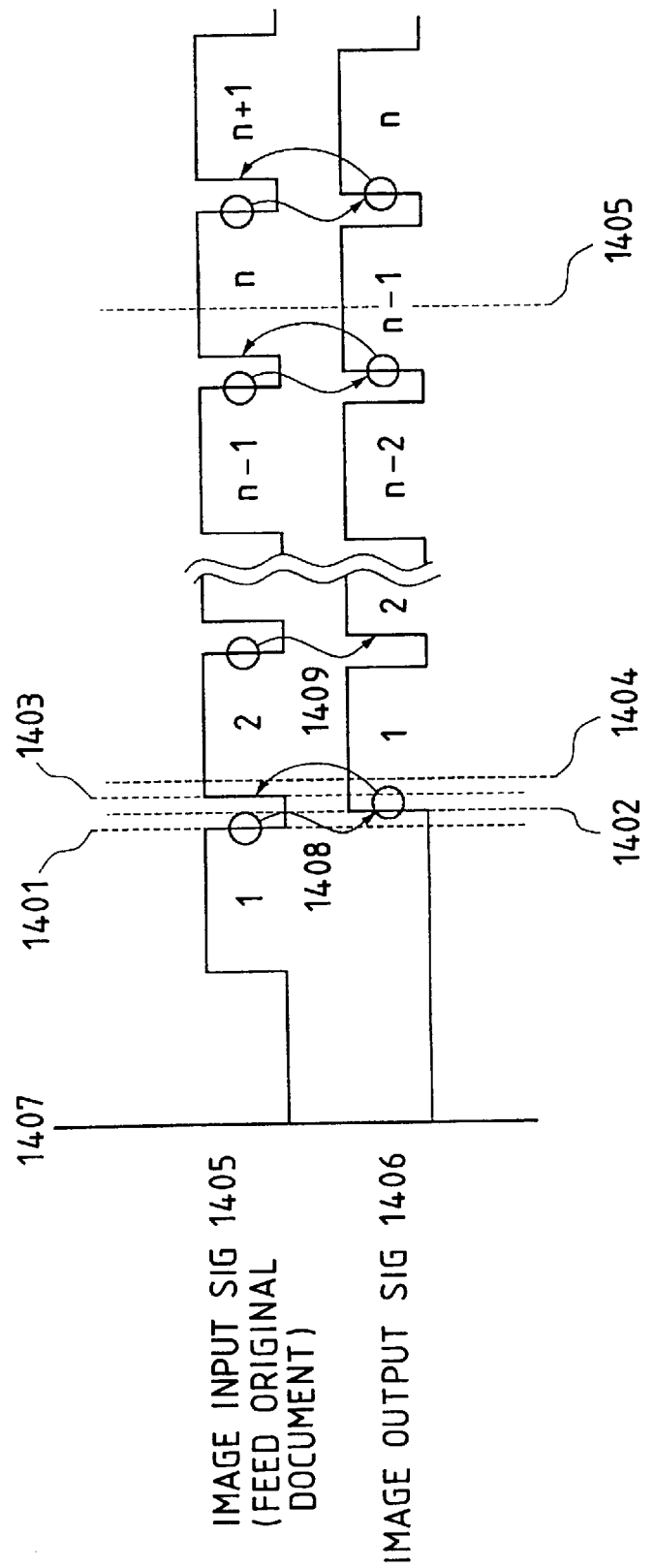
FIG. 21 shows a time chart of input/output timing of an image to a page memory in the normal operation mode of the image processing apparatus of FIG. 8.
Figure 26:
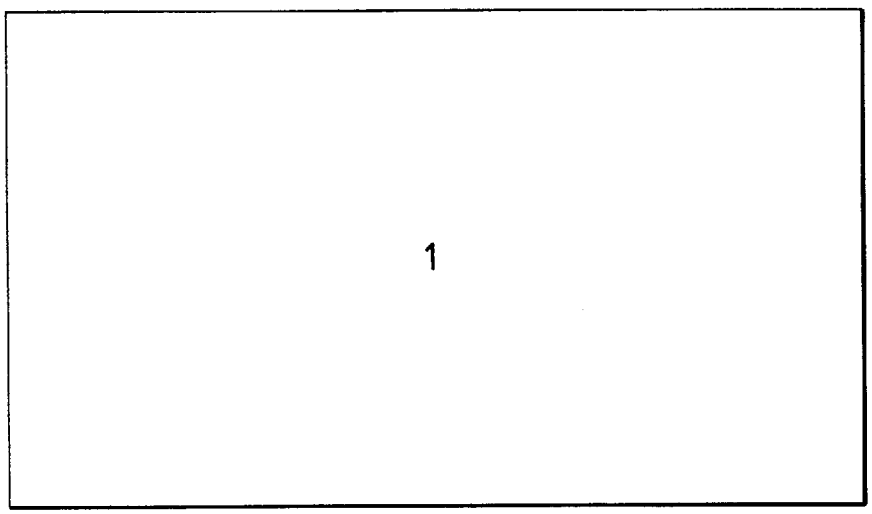
FIG. 26 shows a conceptual view of the page memory when an image 1 occupies the page memory in the image processing apparatus shown in FIG. 8.

An operation timing of an image input signal 1405 inputted to the page memories 119 and 120 and an image output signal 146 outputted from the page memories 119 and 120 is now explained with reference to a timing chart of FIG. 21. The image input signal 1405 is linked to the document sheet feed. In FIG. 21, numerals 1, 2, . . . , n−1, n, n+1 denote the sequence of the read document sheet. From the document sheet scan start (1407), the document sheets fed by the ADF 200, one at a time, are sequentially read by the scanner unit 250 and the image signal from the CCD 111 passes through the filters 117 and 118 and stored in the page memory 119 or 120. Thereafter, the storing of one page of image data is completed (1401). The page memory 119 or 120 in this status is shown in FIG. 26. As shown in FIG. 26, when the document sheet is of A3-size, the entire area of the page memory 119 or 120 is occupied by the first page of data.

Figure 27:
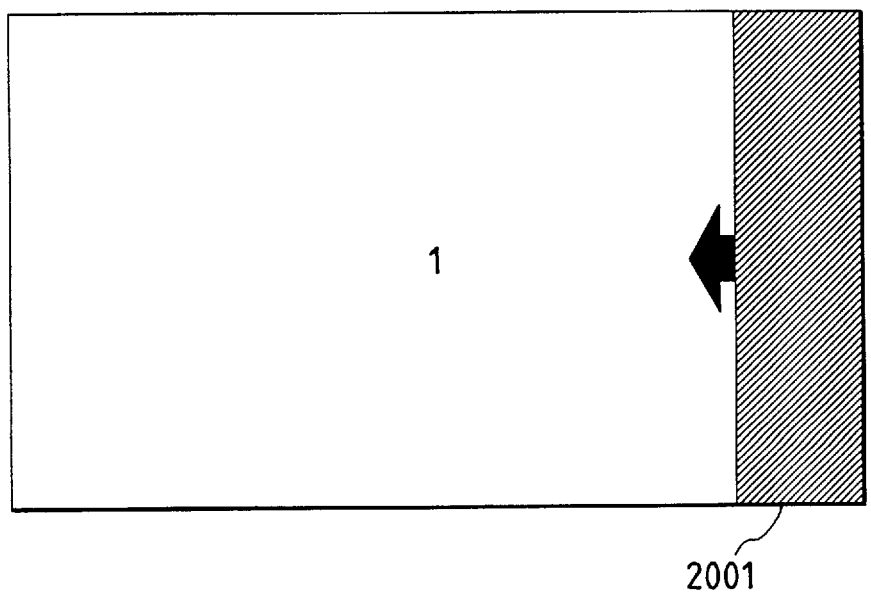
FIG. 27 shows a conceptual view of the page memory when the outputting of the image 1 is started from the page memory in the image processing apparatus shown in FIG. 8.

Upon completion of one page of image input (1408), the controller 123 starts to output the image signal from the page memory 119 or 120 to the PBM 65. Upon the start of the image output (1409), the controller 123 commands to the ADF 200 to feed the next document sheet to the moving read position 203. In this manner, the storing of the document sheet data of the second page to the page memory 119 or 120 is started (1403). The page memory 119 or 120 in this status is shown in FIG. 27. As shown in FIG. 27, the areas of the page memory 119 or 120 from which the images have been outputted are sequentially released as an open area 2001.

Figure 28:
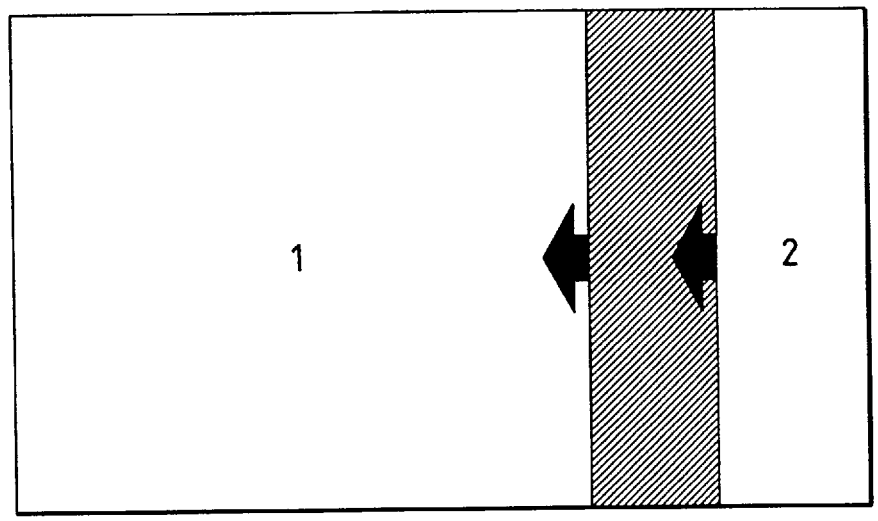
FIG. 28 shows a conceptual view of the page memory when images 1 and 2 coexist in the page memory in the image processing apparatus shown in FIG. 8.
Figure 29:
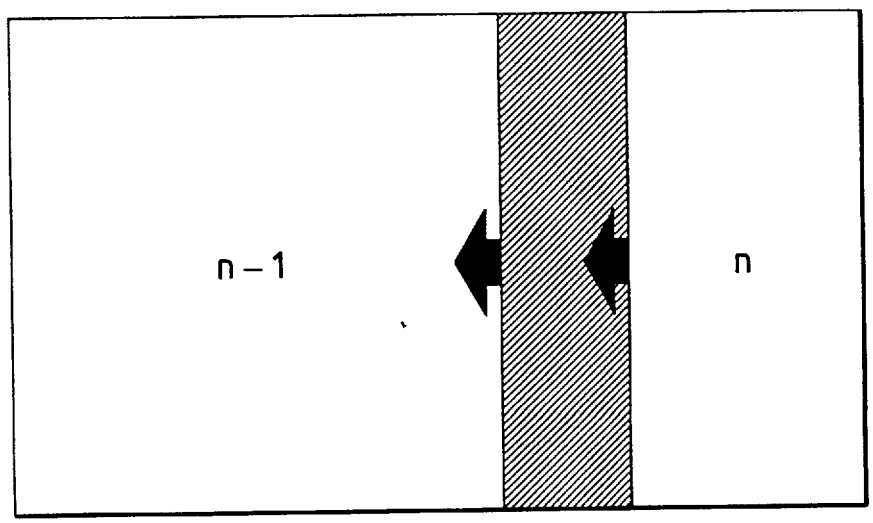
FIG. 29 shows a conceptual view of the image memory when images n–1 and n coexist in the page memory in the image processing apparatus shown in FIG. 8.

The second page of document sheet is written into the open area 2001, and at a time 1404 of FIG. 21, the page memory 119 or 120 assumes a status as shown in FIG. 28. In general, during the period of outputting the page (n−1) and inputting the page n (1405), two pages of image data as shown in FIG. 29 coexist in the page memory 119 or 120.
[Transition from Normal Operation Mode to Almost Full Mode]

As described above, in the step S1101 of FIG. 18, when the controller 123 determines a possibility of the full status of the PBM based on the image data amount for which the compression factor has been predicted and the remaining capacity detection signals 198 and 199, the almost full mode of the step S1003 of FIG. 17 is assumed.

Figure 22:
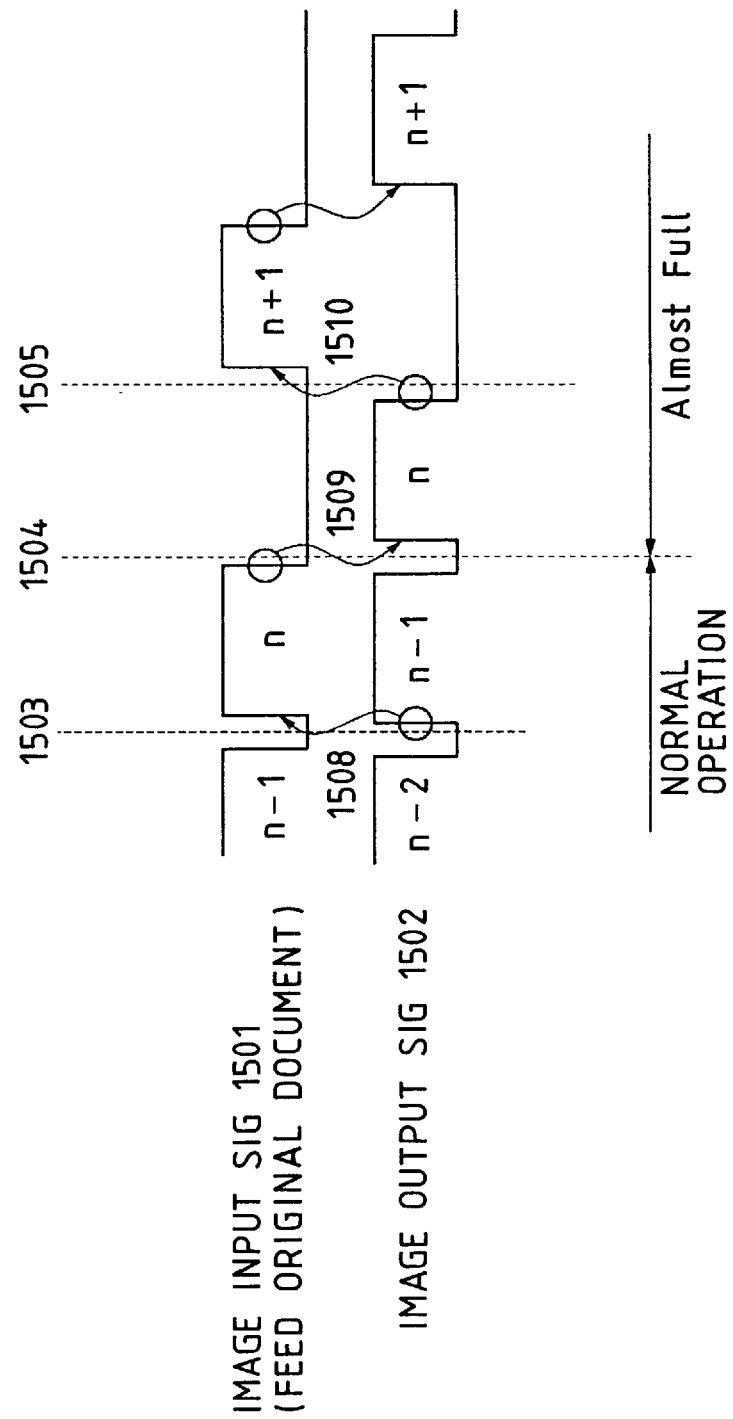
FIG. 22 shows a time chart of input/output timing of an image to the page memory in the transition from the normal operation mode to the almost full mode of the image processing apparatus shown in FIG. 8.

An operation of the transition is explained with reference to the timing chart of FIG. 22. In FIG. 22, n−1, n, n+1, n+2 denote the sequence of the read document sheets. Numerals 1501 and 1502 denote input and output of the document sheet data, respectively, for the page memory 119 or 120. In FIG. 22, the process operates in the normal operation mode of the step S1002 of FIG. 10, until the room to store one page of document sheet disappears in the PBM 65 (1504). After the time 1504 of FIG. 22, the PBM 65 does not have the room to store one page of image data so that whether the image data currently stored in the page memory 119 or 120 can be stored in the PBM 65 or not can be first determined by actually storing the image data in the PBM 65. This status is referred to as the almost full mode. In this status, since an operation to check whether the n-th image data has been actually stored in the PBM 65 or not is needed, the storing of the next page of image data to the page memory 119 or 120 cannot be executed until the check is completed. Accordingly, the ADF 200 shown in FIG. 9 is operated to limit the number of sheets per unit time fed by the fed unit 205. Namely, the document sheet interval is set longer than that in the normal operation mode (skip operation or step operation) so that the feed can be stopped at any time. When the mode is changed to the almost full mode, the controller 123 of FIG. 11 commands the operation of this sequence to the ADF 200 and the skip operation sequence is continued until the almost full mode is released.

The sequence in the almost full mode may be conducted by controlling the number of sheets per unit time to be fed by the feed unit 205 of the ADF 200 of FIG. 9 as shown in the present embodiment, or by controlling the sheet feed speed and the feed speed in the feed path 206.

[Almost Full Mode]

An operation in the almost full mode is explained with reference to a flow chart of FIG. 19. In the almost full mode of the step S1003 of FIG. 17, whether a room to store the image data for which the compression factor has been predicted is present in the PBM 65 or not is always monitored based on the remaining capacity detection signals 198 and 199, and if the room is available, the process is shifted to the normal operation mode. Further, whether a vacant area is present in the PBM 65 or not is monitored, and if no vacant area is available, the process assumes the PBM full mode as described above.

When the mode is changed from the normal operation mode to the almost full mode, whether a room to store the image data for which the compression factor has been predicted is available or not in a step S1202, and if it is available, the process proceeds to the normal operation mode, and if it is not available, the process proceeds to a step S1201. In the step S1201, whether there is a vacant area in the PBM or not is determined, and if there is vacant area, the process proceeds to a step S1202 and if there is no vacant area, the process shifts to the PBM full mode.

Figure 19:
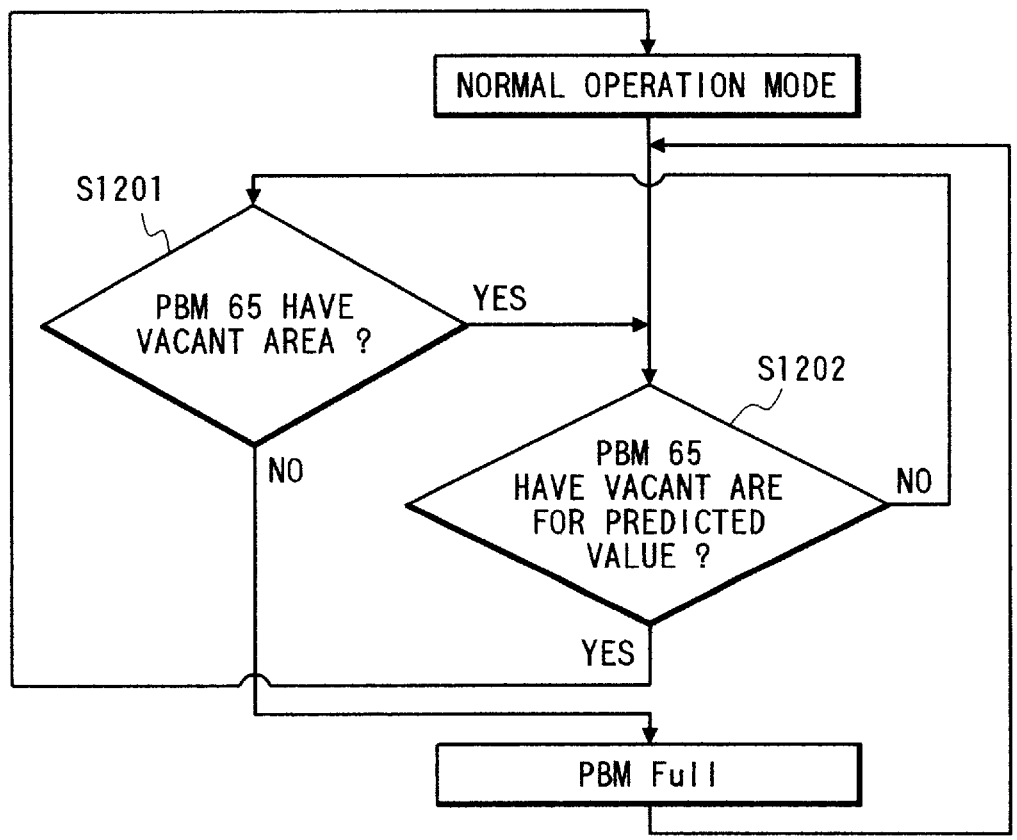
FIG. 19 shows a flow chart of an operation control process in an almost full mode of the image processing apparatus shown in FIG. 8.

In the almost full mode in the step S1003 of FIG. 17, the present apparatus alternately transits between the steps S1201 and S1202 of FIG. 19.

An operation in the almost full mode is explained with reference to the timing chart of FIG. 22. In the normal operation mode in the step S1002 of FIG. 17, in response to the start of outputting of the image data of the previous document sheet n from the page memories 119 and 120 (1408 in FIG. 21), the next document sheet (n+1) is fed to the moving read position 203 as described above in connection with the normal operation mode by FIG. 21. In the almost full mode in the step S1003 of FIG. 17, since the image data of the document sheet n is not stored in the PBM 65, the next document sheet (n+1) cannot be read until the storing of the image data of the document sheet n has been stored in the PBM 65. Accordingly, in the almost full mode, the feed of the document sheet (n+1) is not started even if the outputting of the image data of the document sheet n is started. That is, in response to the completion of the image input of the page n (1509), the controller 123 starts the outputting of the image of the page n from the page memory 119 or 120 to the PBM 65. In response to the completion of the image output (1510), the controller 123 releases the areas of the page memories 119 and 120 and commands to the ADF 200 to feed the next document sheet (n+1) to the moving read position 203. In this manner, the storing of the document sheet data of the page (n+1) to the page memory 119 or 120 is started. Subsequently, the completion of the reading of the document sheet and the waiting of the completion of the outputting of the image data are alternately repeated and in the almost full mode in the step S1003 of FIG. 17, the sheet interval of the document sheets in the ADF 200 is increased and the productivity is reduced to approximately one-half of that in the normal operation mode in the step S1002 of FIG. 17. However, since the areas of the page memories 119 and 120 are released after the completion of the outputting of the image data, the read data is not broken.

[Transition from Almost Full Mode to PBM Full Mode]

Referring to a flow chart of FIG. 19, a transition operation from the almost full mode to the PBM full mode is explained. When the controller 123 determines in the monitoring in the step S1201 of FIG. 19 that the PBM 65 is full based on the remaining capacity detection signals 198 and 199, it commands to the PBM 65 to discard the image data of the page which is being lastly stored in the PBM 65 and the management information thereof from the PBM 65 and then shifts the mode to the PBM full mode of the step S1004 of FIG. 17.

Figure 23:
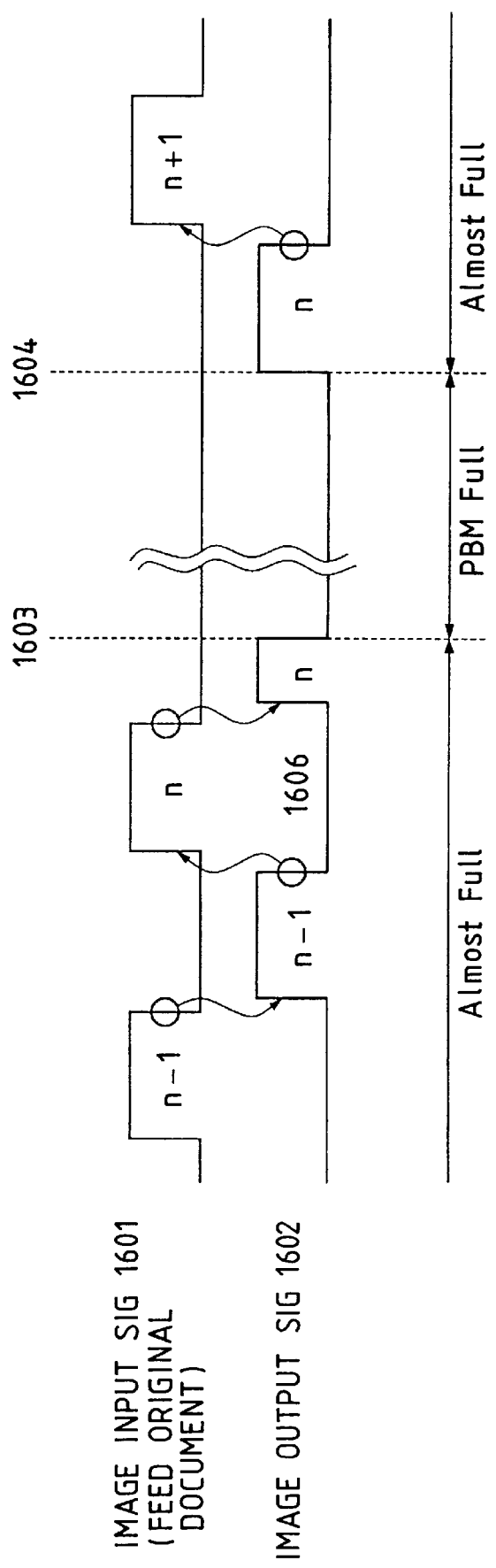
FIG. 23 shows a time chart of input/output timing of an image to the page memory in the transition between the almost full mode and the PBM full mode of the image processing apparatus shown in FIG. 8.

The transition operation is explained with reference to a timing chart of FIG. 23. In FIG. 23, n−1 and n denote the sequence (pages) of the read document sheets. Numerals 1601 and 1602 denotes input and output respectively, of the document sheet data for the page memories 119 and 120. In FIG. 23, numeral 1603 denotes a time at which a vacant area is no longer available in the PBM 65 in the course of outputting the image data of the document sheet n to the PBM 65. The almost full mode operation in the step S1003 of FIG. 17 is conducted until a vacant area in the PBM 65 becomes unavailable (1603). After the time 1603 in FIG. 23, there is no space to store the document sheet data in the PBM 65 and the outputting of the image to the PBM 65 is interrupted. This status is referred to as the PBM full mode. The image of the document sheet n in the page memories 119 and 120 is maintained.

In this status, since the reading of the document sheet is stopped until a vacant area to store the data becomes available in the PBM 65, the ADF 200 shown in FIG. 9 stops the feeding of the sheet by the sheet feed unit and waits for the command to start from the controller 123 of FIG. 11. Namely, at the time of shifting to the PBM full mode, the controller 123 of FIG. 11 commands to the ADF 123 of FIG. 11 to stop the moving read image read sequence operation.

At the time of shifting to the PBM full sequence, the document sheet (n+1) in the feed path is stopped before it reaches the moving read image read position 203.

The document sheet which is in the feed path but the reading therefor has been completed and located at a position which permits the ejection is not stopped but ejected. In FIG. 9, in the one-side read mode, the document sheets are withhold in the feed path 205 and the convey path 206. The document sheet on the convey path 207 is ejected. In the dual-side read mode, the document sheets are withhold in the feed unit 205 and the convey paths 206 and 208 and the document sheet in the convey path 209 is ejected.

As described above, each of the convey paths can be independently driven, stopped and speed-controlled. Accordingly, as shown in FIG. 9, the feed unit 205 or the convey paths 206 and 208 are provided with independent wait positions 211 and 212 to attain the withholding of the document sheet in the PBM full mode.

[PBM Full Mode]

Figure 20:
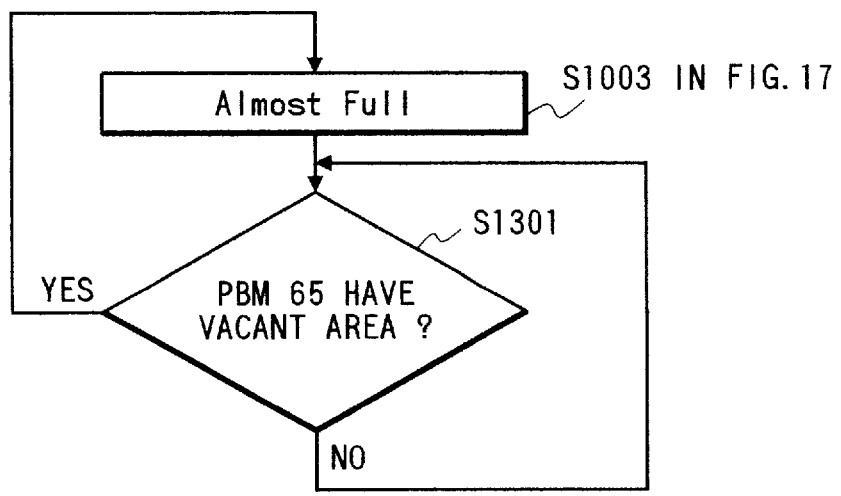
FIG. 20 shows a flow chart of an operation control process in a PBM full mode of the image processing apparatus shown in FIG. 8.

An operation in the PBM full mode is now explained with reference to the flow chart of FIG. 20 and the timing chart of FIG. 23. In the step S1004 of FIG. 17, whether there is a vacant area in the PBM 65 or not is continuously monitored based on the remaining capacity detection signals 198 and 199, and if there is no vacant area, the process returns to the step S1301 of FIG. 20 to monitor whether a vacant area becomes available in the PBM 65 or not. If it is determined that a vacant area is available in the PBM 65, the mode is shifted to the almost full mode of the step S1003 of FIG. 17, and if it is determined that no vacant area is available, the process returns to the step S1301 to conduct the monitoring again. In the PBM full mode of the step S1004 of FIG. 17, the occurrence of a vacant area in the PBM 65 is waited (for a period from 1603 to 1604 in FIG. 23).

The operation of the ADF 200 shown in FIG. 9 is in the stop status and waiting for a resume command from the controller 123.

[Recovery of PBM Full Mode]

The recovery from the PBM full mode is explained with reference to the timing chart of FIG. 23. In the step S1301 of FIG. 20, if it is determined that a vacant area is available in the PBM 65 based on the remaining capacity detection signals 198 and 199, the controller 123 starts to output from the top of the image data stored in the page memories 119 and 120 (the image of the document sheet n outputted to the PBM 65 in the PBM full mode). As described above, the control mode of the controller 123 is in the almost full mode in the step S1003 of FIG. 17 from the start of the image output. If the vacant area of the PBM 65 available at that time is smaller than the capacity to store one page of document sheet and the vacant area in the PBM 65 is again exhausted, the PBM full mode of the step S1004 of FIG. 17 is again assumed and the expansion of the vacant area in the PBM 65 is waited.

When a vacant area is available in the PBM 65 and the almost full mode is assumed and the storing of the image output from the page memories 119 and 120 to the PBM 65 is completed, the controller 123 of FIG. 11 commands to resume the operation of the ADF 200 shown in FIG. 9. When the ADF 200 receives the command, the ADF 200 resumes the feed of the document sheet (n+1) which is standing by in the stand-by positions 211 and 212 of FIG. 9 and the document sheet on the document sheet tray, and resumes the reading at the moving read image read position 203.

[Recovery from Almost Full Mode]

As described above, when the present apparatus shifted from the normal operation mode in the step S1002 of FIG. 17 or the PBM full mode to the almost full mode in the step S1003 determines in the step S1202 of FIG. 19 that the image data for which the compression factor has been predicted may be stored in the PBM 65 based on the remaining capacity detection signals 198 and 199, it assumes the normal operation mode of the step S1002 of FIG. 17.

A recovery operation from the almost full mode is now explained with reference to timing charts of FIGS. 24 and 25.

Figure 24:
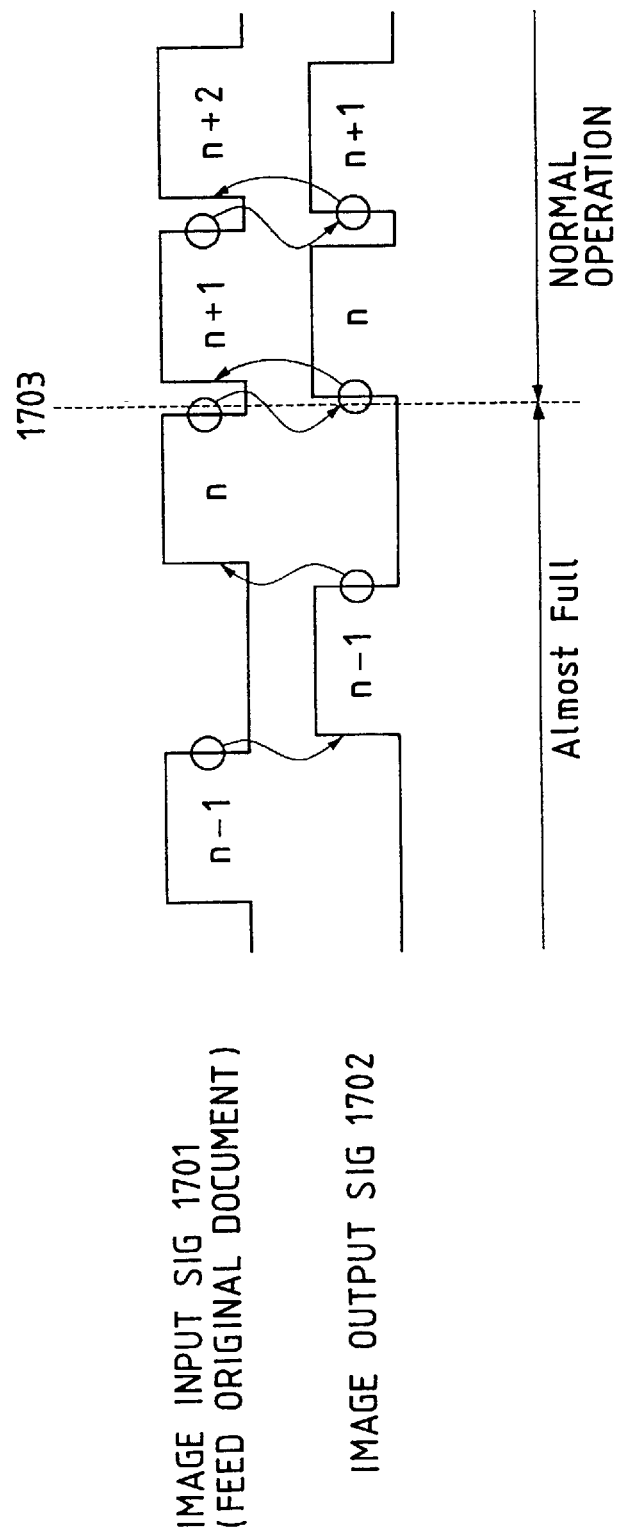
FIG. 24 shows a time chart of input/output timing of an image to the page memory in the recovery from the almost full mode of the image processing apparatus shown in FIG. 8.

FIG. 24 shows a status in which a storage space for the image of the page (n−1) document sheet is created in the PBM 654 by the reading of the image from the PBM 65 during the reading of the page (n−1) document sheet. In FIG. 24, n−1, n, n+1, n+2 denote the sequence of the read document sheets. Numerals 1701 and 1702 denote input and output of the document sheet, respectively, for the page memories 119 and 120. When a vacant area to store the one page of image data for which compression factor has been predicted is not available in the PBM 65, the almost full mode of operation in the step S1003 of FIG. 17 is conducted. After 1703 when the creation of a larger vacant area than predicted in the PBM 65 is detected during the reading of page n document sheet by a reason that the outputting of all of a large image data of other job is completed or other job coexisted in the PBM 65 is discarded, the almost full mode is released and the page (n+1) document sheet may be read without waiting the completion of the page n image data.

Figure 25:
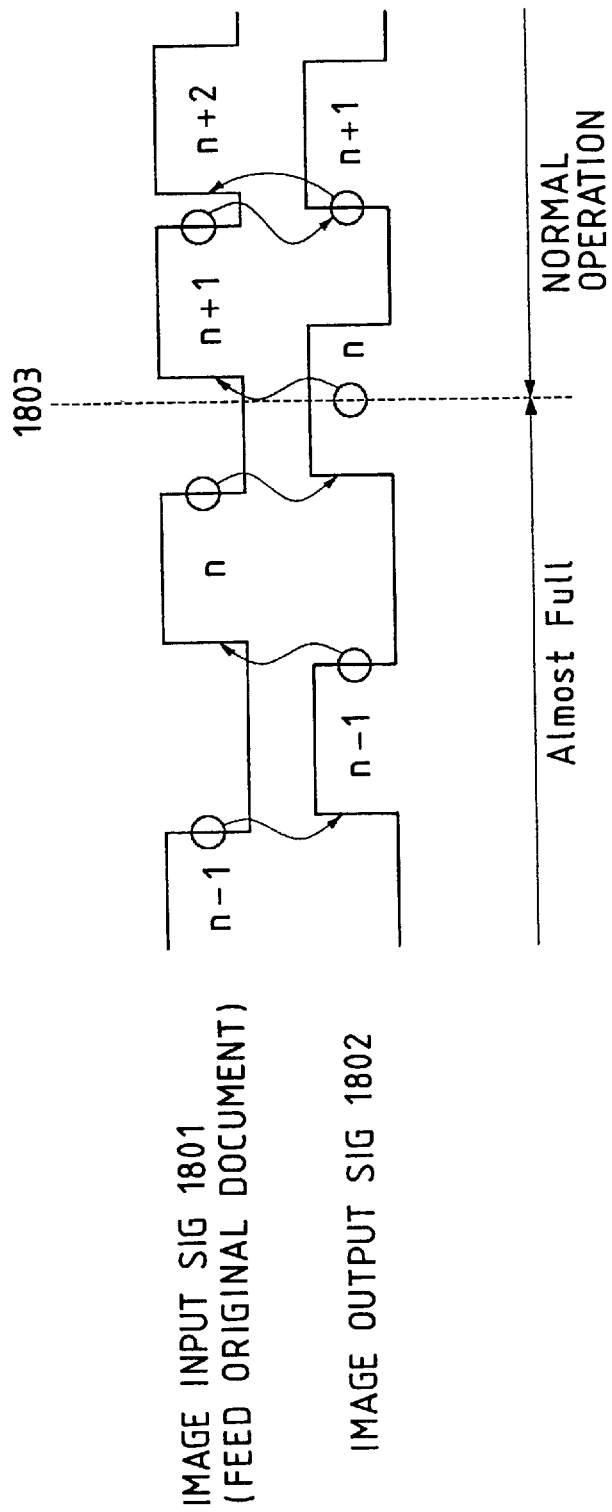
FIG. 25 shows a time chart of input/output timing of an image to the page memory in the recovery from the almost full mode of the image processing apparatus shown in FIG. 8.

FIG. 25 shows a status in which the almost full mode is released during the outputting of the page n image data. In FIG. 25, n−1, n, n+1, n+2 denote the sequence of the read document sheets. Numerals 1801 and 1802 denote input and output of the document sheet, respectively, for the page memories 119 and 120.

Figure 30:
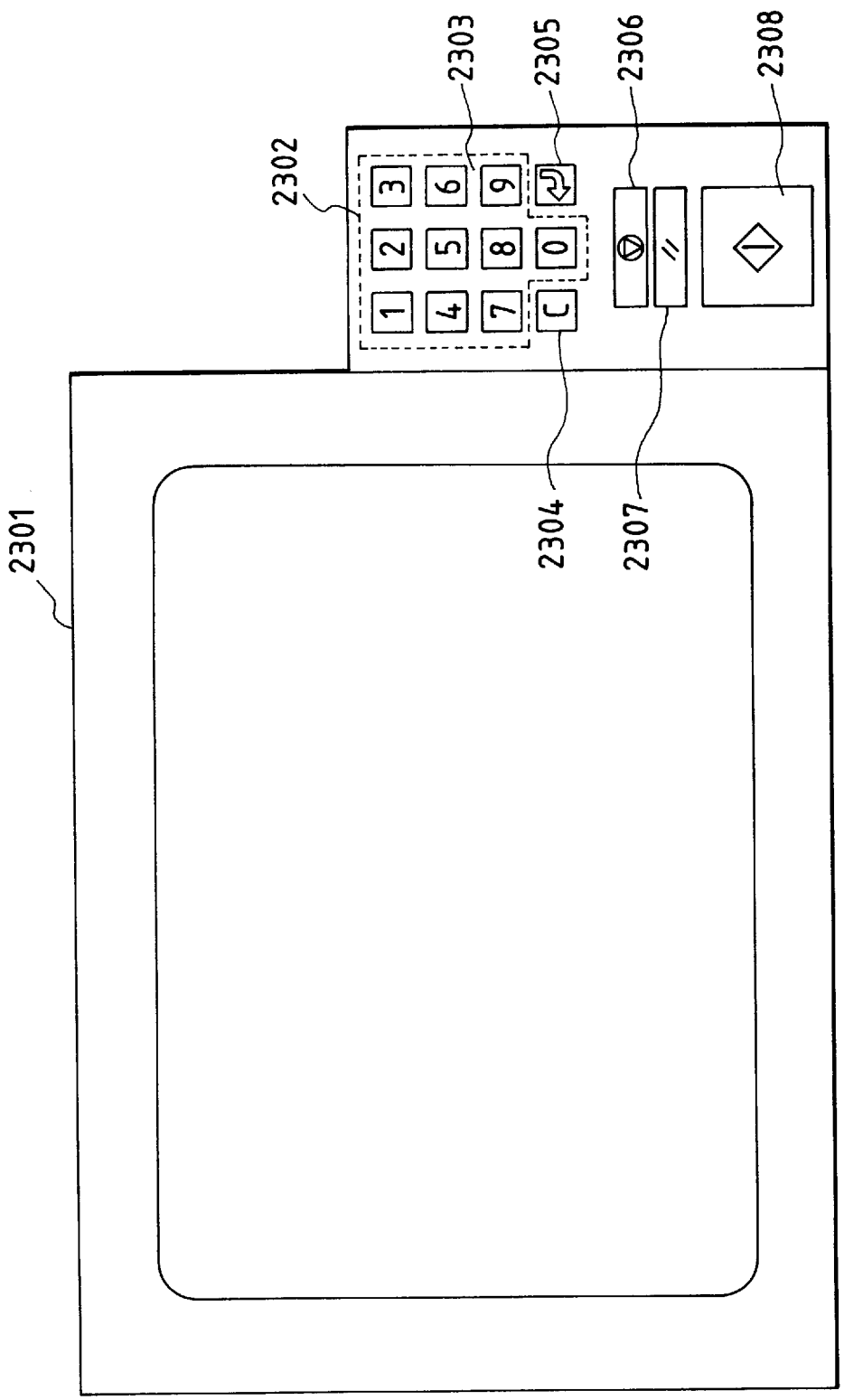
FIG. 30 shows a conceptual view of a console unit in the image processing apparatus shown in FIG. 8, FIGS. 31 to 33 show conceptual views of a console screen of the console unit in the image processing apparatus shown in FIG. 8.

FIG. 30 shows a conceptual view of the OCU 53. In FIG. 30, numeral 2301 denotes a CRT screen and a user selection is inputted by touch type input. The CRT screen 2301 may be substituted by an LCD or an FLC. Instead of the touch type input, the input by a pointing device such as a mouse or an input pen may be used. Numeral 2302 denotes a key pad, numeral 2303 denotes a numeric ten-key, numeral 2304 denotes a clear key, numeral 2305 denotes an enter key, numeral 2306 denotes a step key, numeral 2307 denotes a reset key and numeral 2308 denotes a start key.

Figure 31:
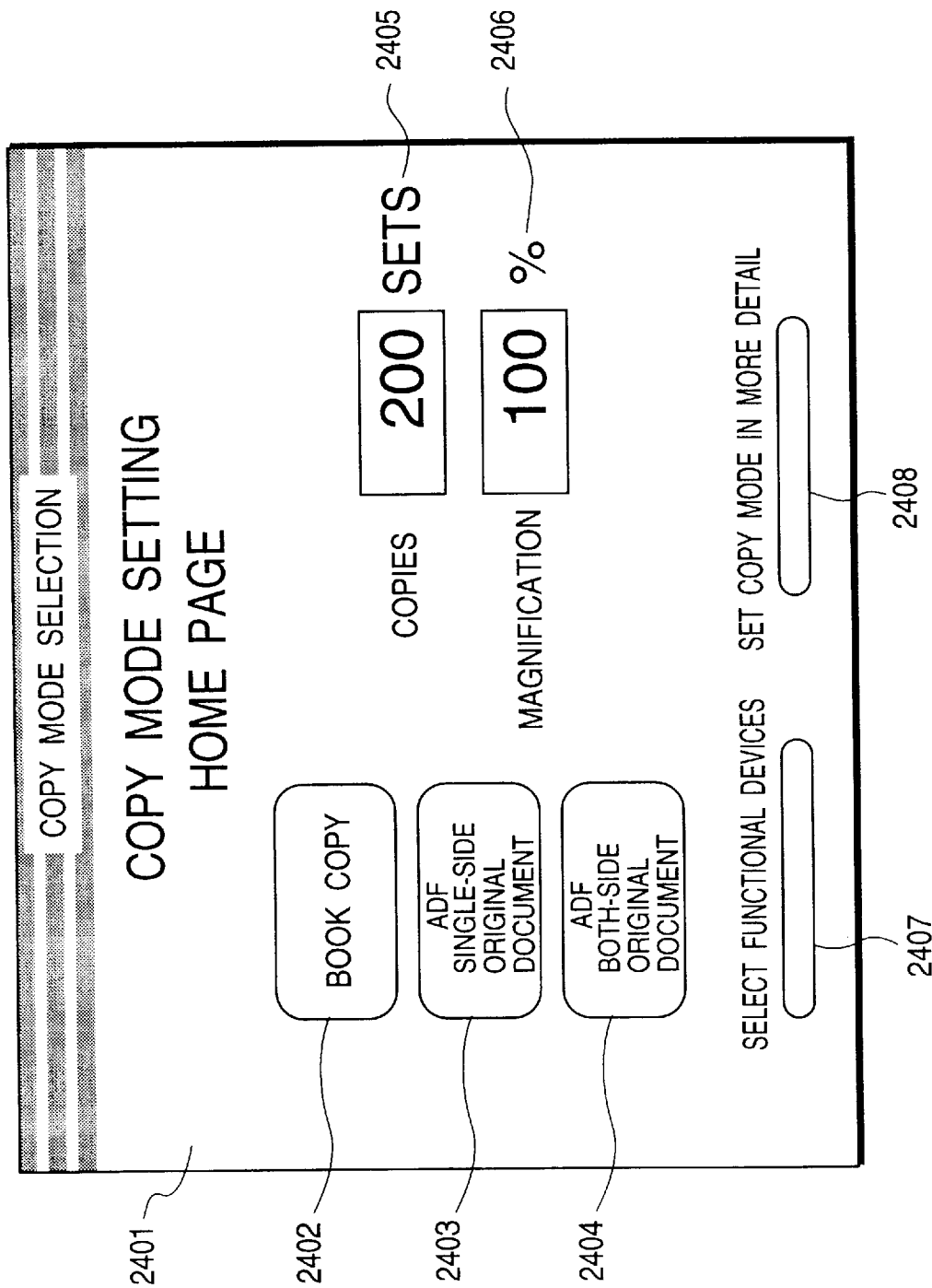

A basic configuration of the OCU 53 has been described above. FIG. 31 shows a display, a selection menu and settings on the display unit. In FIG. 31, numeral 2401 denotes a standard menu screen in the CRT screen 2301. Numeral 2402 denotes a selection area for a book mode (in which a document sheet a set on the platen and it is read by scanning the optical system), numeral 2403 denotes a selection area for a one-side copy mode of the moving read image read, numeral 2404 denotes a selection area for a dual-side copy mode of the moving read image read, numeral 2405 denotes a selection area for a number of copies, numeral 2406 denotes a selection area for a copy magnification factor, numeral 2407 denotes a selection area for function devices of the copying machine (sheet feed stacker, stapler, saddle switcher, group binder, mail box sorter, etc.) and numeral 2408 denotes a selection area for detail copy mode when detailed setting is to be conducted in the copy mode.

Figure 32:
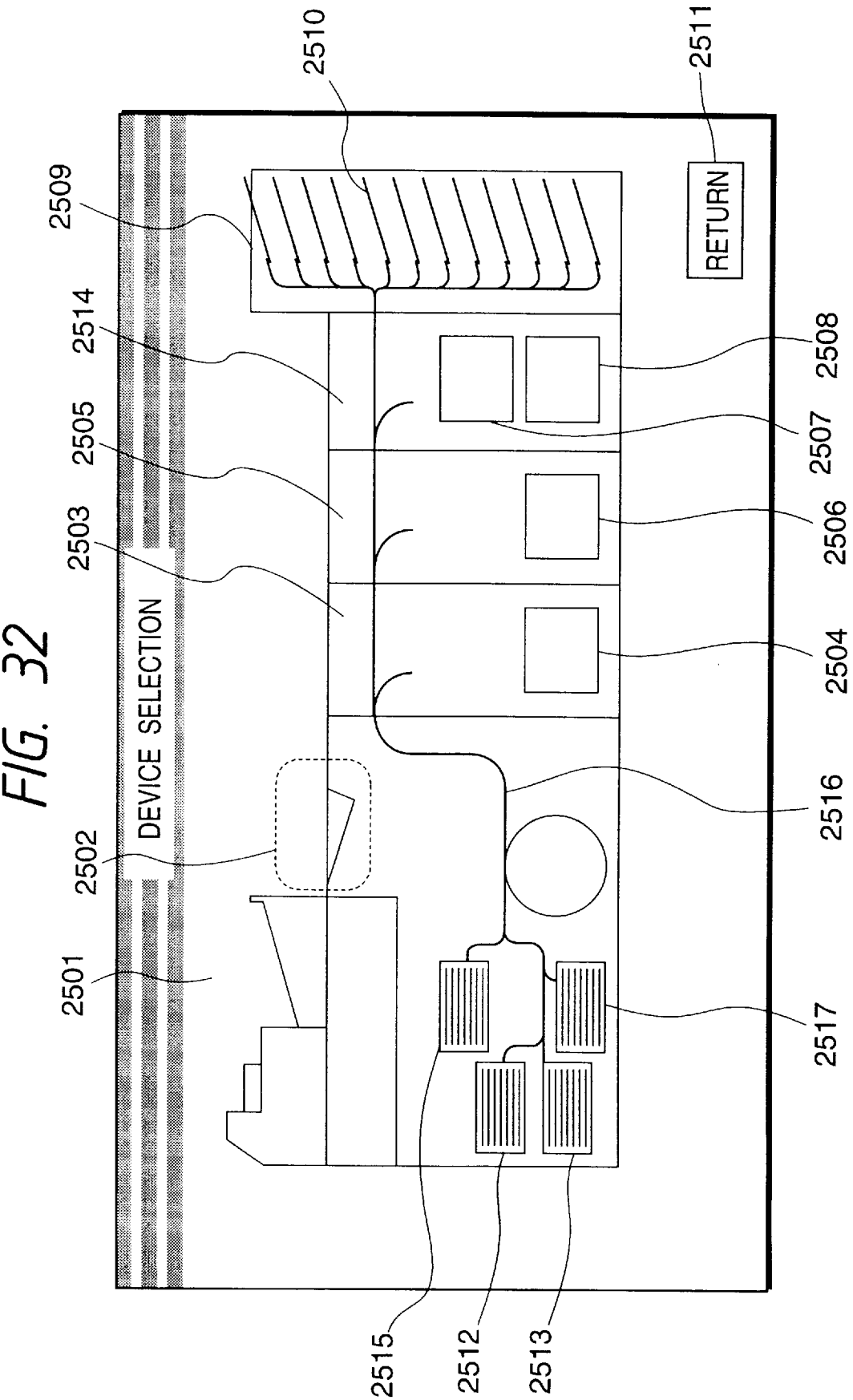

FIG. 32 shows a display status when a device select is selected by the selection area 2407 for selecting the function device. In FIG. 32, numeral 2501 denotes a screen. The copying machine and all accessories of the copying machine are displayed to permit the selection n of any function. In FIG. 32, numeral 2502 denotes a proof tray to which a test printed sheet on which the image after the copying is printed to test the finishing is ejected, numeral 2503 denotes a stapler, numeral 2504 denotes a stacker for accommodating the stapled output sheets, numeral 2505 denotes a saddle stitcher, numeral 2506 denotes a stacker for accommodating the output sheets saddle-stitched by the saddle stitcher 2505, numeral 2514 denotes a group binder, numerals 2507 and 2508 denote a stacker for books processed by the group binder 2514, numeral 2509 denotes a mail box sorter, numeral 2510 denotes an output sort pin for sorting by the mail box sorter 2509 and numeral 2511 denotes a selection area to return to the screen 2501. Numerals 2512, 2513, 2517 and 2515 denotes sheet feed stages 1, 2, 3 and 4, respectively. The user set transfer sheets are accommodated in the sheet feed stages 1, 2, 3 and 4. Numeral 2516 denotes a screen area to display a flow of the feed of the output sheets to the function devices on real time basis.

Figure 33:
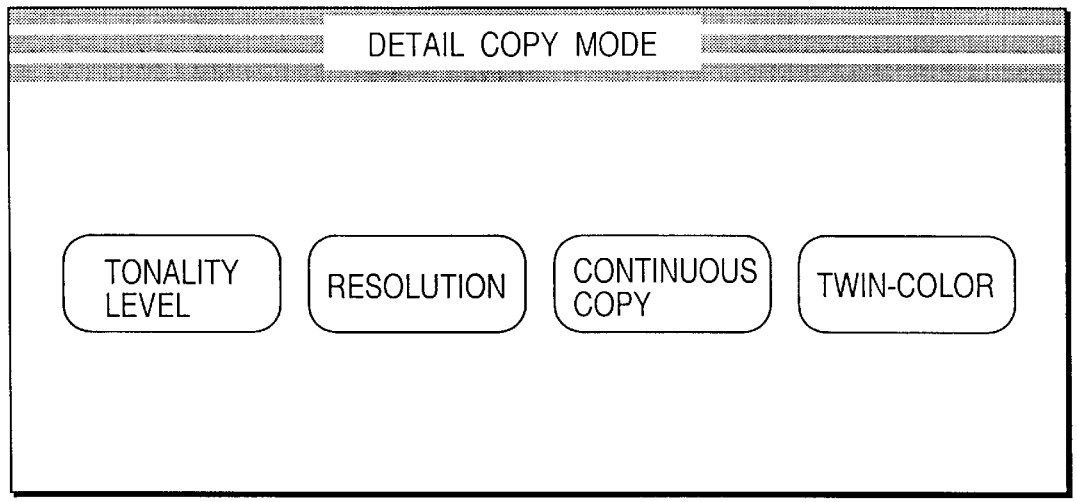

FIG. 33 shows a screen display status when a copy mode detail is selected by the detail copy mode selection area 2408 of FIG. 31. The copy functions in the image processing such as the number of tones, the resolution, the multi-copying or the twin-color are selected.

Figure 34:
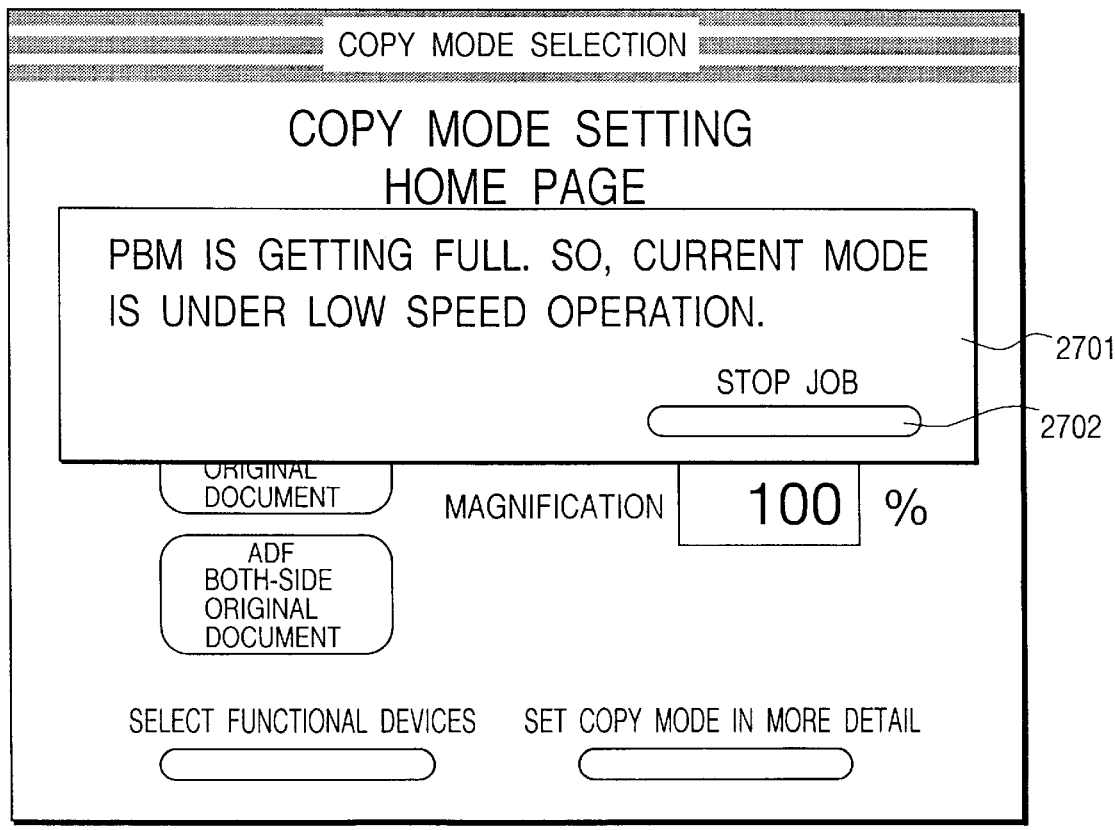
FIG. 34 shows display of the console screen of the console unit in the almost full mode in the image processing apparatus shown in FIG. 8.

FIG. 34 shows a screen display status in the almost full mode. In this mode, since the image data is transferred to the PBM 65 while checking the vacant area of the PBM 65 as described above, the processing speed is low. Numeral 2701 in FIG. 34 denote display information for informing the status to the user and numeral 2702 denotes a selection area for releasing the job set by the user in that status.

Figure 35:
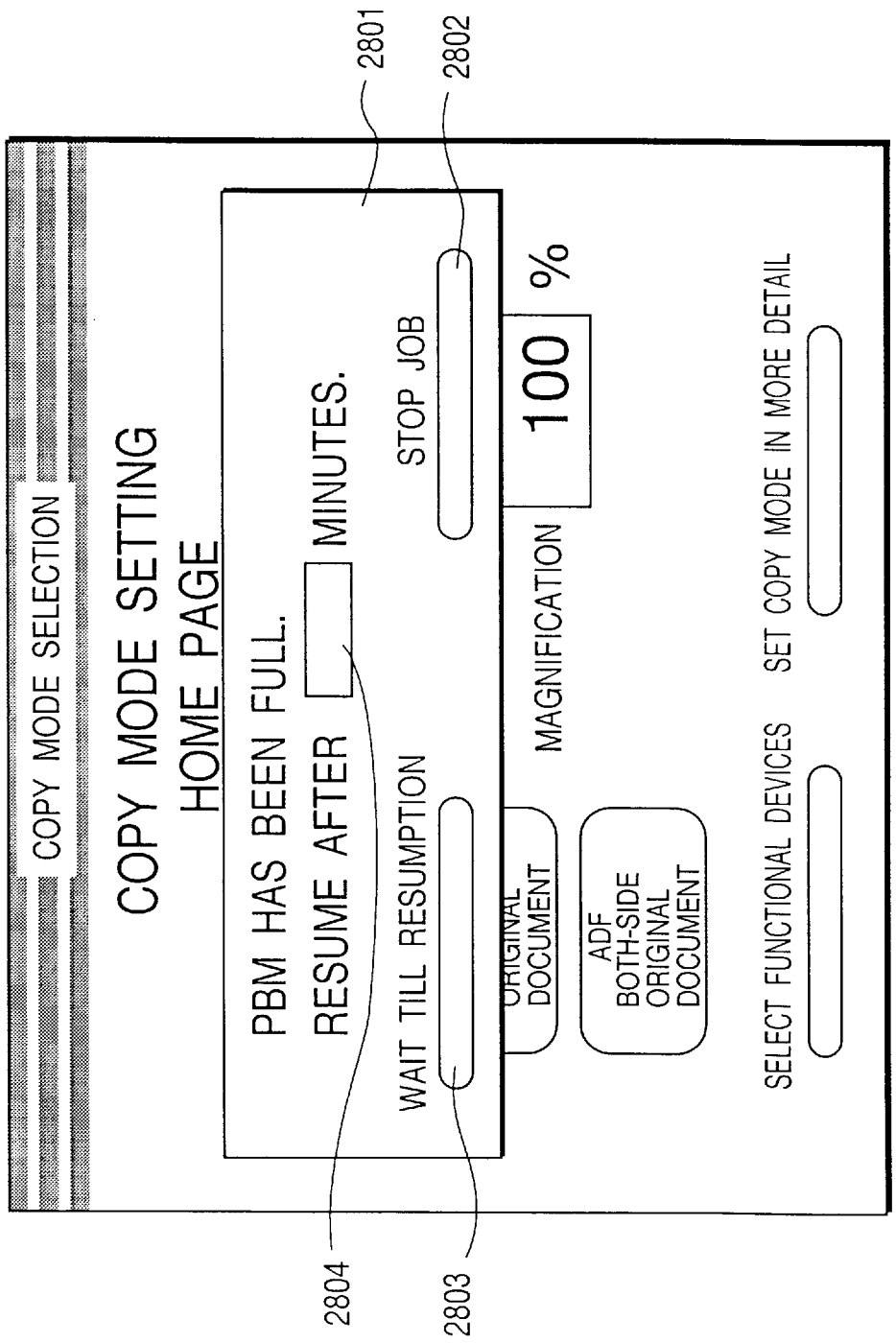
FIG. 35 shows display of the console screen of the console unit in the PBM full mode in the image processing apparatus shown in FIG. 8.

FIG. 35 shows a screen display status in the PBM full mode. In this mode, the image reading is temporarily stopped and the reading is withheld until the PBM full mode disappears. In FIG. 35, numeral 2801 denotes display information to inform that status, numeral 2804 denotes a display of wait time, numeral 2802 denotes a selection area for releasing the job set by the user in that status and numeral 2803 denotes a selection for waiting the start of the reading of the document sheet in the PBM full mode.

Figure 36:
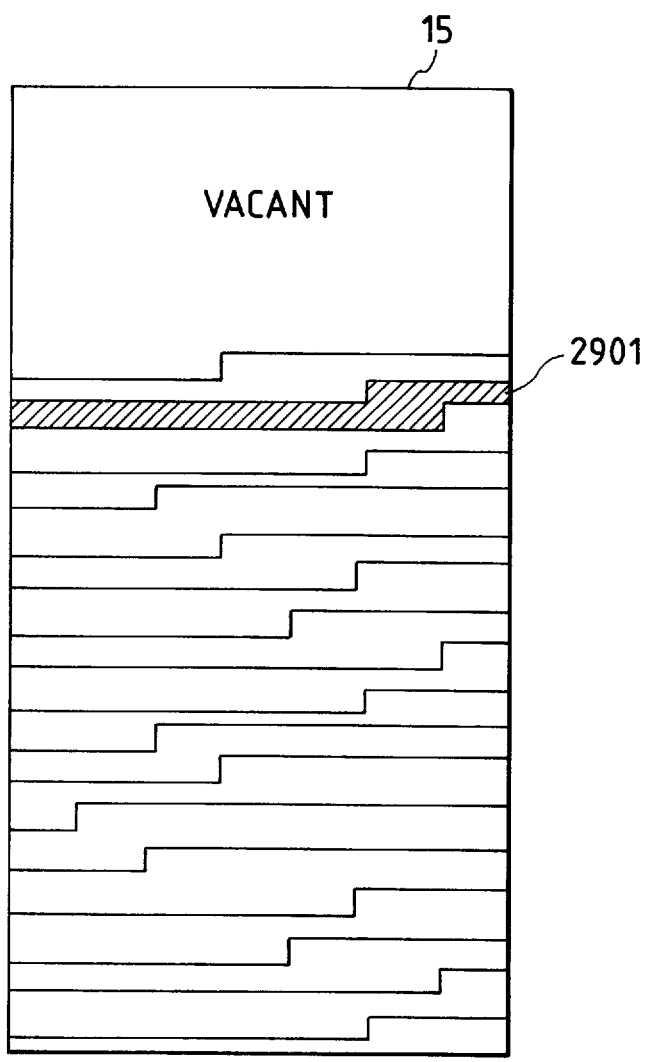
FIG. 36 shows image data in the printer buffer memory.
Figure 37:
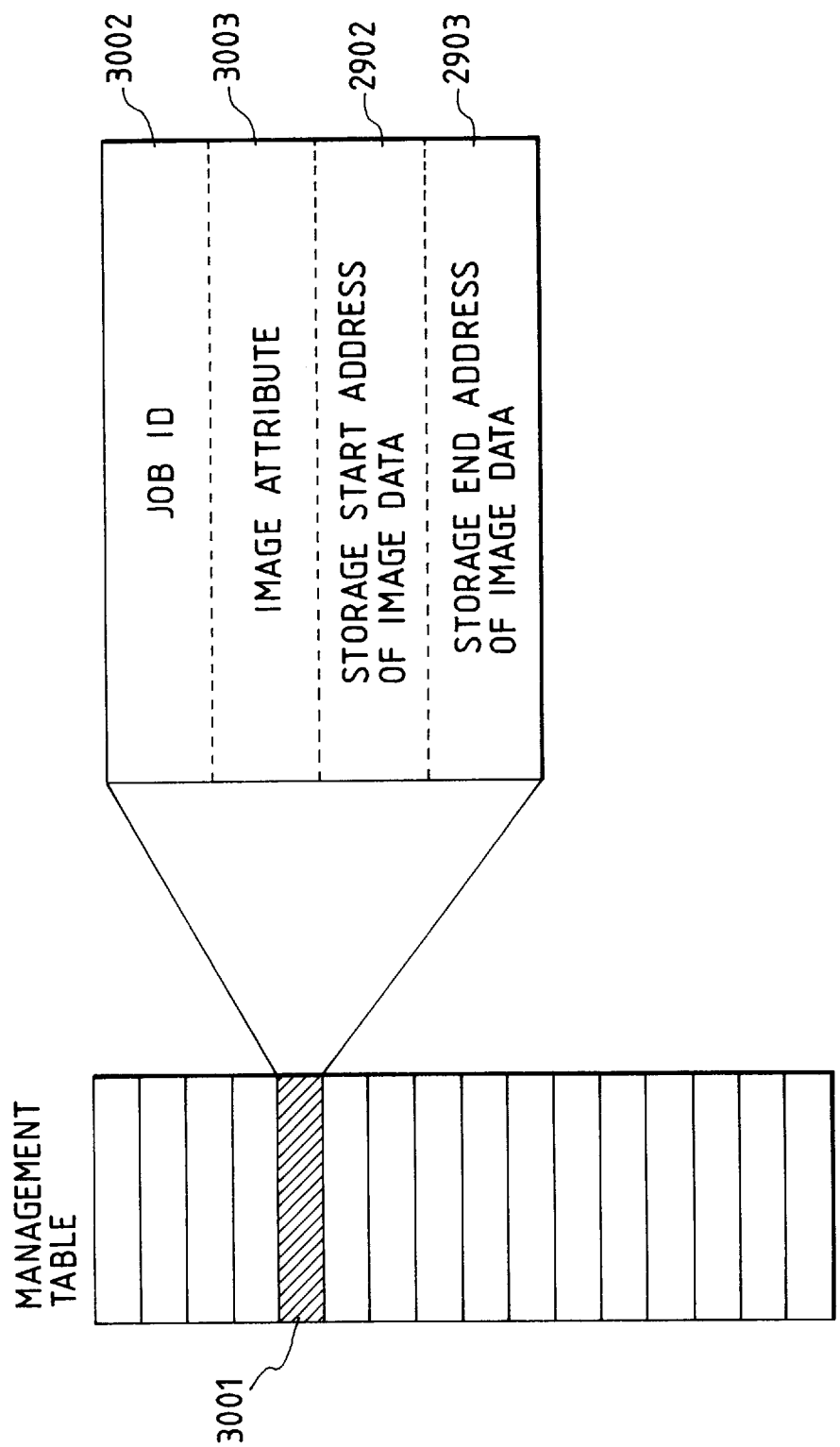
FIG. 37 shows a management table of the printer buffer memory.

The memory area management of the PBM 65 is now explained with reference to the drawing. The PBM 65 is managed by a file allocation table (FAT) shown in FIG. 38. FIG. 36 shows a status in which image data 2901 of a plurality of jobs is stored in the PBM 65. FIG. 37 shows a management table of the PBM 65. Numeral 3001 shows management information for the image data and comprises a job ID 3002, an image attribute 3003, an image data storage start address 2902 and an image data storage end address 2903. The job ID 3002 is intended to identify a plurality of jobs which share the PBM 65 and it is provided with a number unique to each job. The image attribute 3003 includes information necessary when the image data is outputted from the PBM 65 such as the page number of the read document sheet and the bit depth of the image data. The image data storage start address 2902 and the image data storage end address 2903 indicate the addresses on the FAT. When the image data is to be outputted from the PBM 65, the image data storage start address is read from the FAT address written in the image data storage start address 2902. The FAT also indicates the next FAT address 3102 and the management data are sequentially read from the FAT until the image data storage end address is reached to restructure the image data.

As described above, in accordance with the document sheet read apparatus of the present invention, the document sheets are fed to the read position, one at a time, fed past the read position, the image of the document sheet is read while the document sheet passes through the read position, the image data of the image is stored in the page memory, the predetermined image processing is applied to the image data read from the page memory and the image-processed image data is stored in the print buffer memory. When the volume of the image data stored in the page memory and image-processed is smaller than the vacant area of the print buffer memory, the document sheets are fed at the first document sheet interval, and when the occupied area exceed the vacant area, the document sheets are fed at the second document sheet interval larger than the first interval. Thus, when the print buffer memory has a sufficient room, the document sheets may be read at the high speed so that the failure to store the image data of the read document sheet into the buffer memory when the room in the print buffer memory decreases is prevented.

While the present invention has been described in connection with the preferred embodiments thereof, it should be understood that the present invention is not limited to the above embodiments but various modifications and changes may by made without departing from the scope of the claims.

What is claimed is:

1. An image processing apparatus comprising:
   read means for sequentially reading a plurality of document sheets to generate pages of image data;
   first memory means for storing at least one page of image data generated by said read means corresponding to at least a current document sheet;
   data compression means for compressing the image data stored in said first memory means and for outputting the compressed image data;
   second memory means having a predetermined memory capacity for storing the compressed image data output from said data compression means;
   prediction means for predicting an amount of the compressed image data to be output from said data compression means; and
   control means for controlling the reading of a next document sheet following the current document sheet by said read means in accordance with a relationship between a vacant capacity of said second memory means and the amount of the compressed image data predicted by said prediction means.

2. An image processing apparatus according to claim 1, further comprising feed means for sequentially feeding the plurality of document sheets to a read position of said read means,
   wherein said control means controls the feed of the next document sheet by said document sheet feed means.

3. An image processing apparatus according to claim 1, wherein said control means controls said read means so as to temporarily stop the reading of the next document sheet when the vacant capacity of said second memory means is smaller than the amount of the compressed image data predicted by said predication means.

4. An image processing apparatus according to claim 1, wherein said control means controls the reading of the image data from said first memory means.

5. An image processing apparatus according to claim 1, wherein said prediction means predicts the amount of the compressed image data while the image data is being stored in said first memory means.

6. An image processing apparatus according to claim 1, wherein said prediction means predicts the amount of the compressed image data before the completion of the compression by said data compression means.

7. An image processing apparatus according to claim 5, wherein said prediction means predicts based on a statistical amount of image data.

8. An image processing apparatus according to claim 7, wherein the statistical amount is a mean value of densities of the image data or an entropy of the image data.

9. An image processing method for controlling a read unit for sequentially reading a plurality of document sheets to generate pages of image data, comprising the steps of:
   storing at least one page of the image data generated by the read unit corresponding to at least a current document sheet in a first memory;
   compressing the image data stored in the first memory and outputting the compressed image data;
   storing the compressed image data in a second memory having a predetermined memory capacity;
   predicting an amount of the compressed image data to be output in said compressing step; and
   controlling the reading of a next document sheet following the current document sheet by the read unit in accordance with a relationship between a vacant capacity of the second memory and the amount of the compressed image data predicted in said predicting step.

10. An image processing method according to claim 9, wherein said read unit includes a document sheet feed unit for sequentially feeding the plurality of document sheets to a read position.

11. An image processing method according to claim 10, wherein the feed of the next document sheet by the document sheet feed unit is controlled in said controlling step.

12. An image processing method according to claim 9, wherein the reading of the image data from the first memory is controlled in said controlling step.

13. An image processing method according to claim 9, wherein the reading of the next document sheet is controlled to be temporarily stopped when the vacant capacity of the second memory is smaller than the predicted amount of the compressed image data.

14. An image processing apparatus comprising:

stack means for stacking a plurality of document sheets;

convey means for conveying the document sheets stacked in said stack means, one sheet at a time, to a read position and moving the document sheet past the read position;

read means for reading the document sheet while the document sheet conveyed by said convey means is moved past the read position, so as to output image data;

first memory means capable of storing at least one page of document sheet and storing the image data outputted from said read means;

image processing means for applying a predetermined image processing to the image data outputted from said first memory means;

second memory means having a predetermined memory capacity for storing the image data image-processed by said image processing means;

output means for outputting the image data stored in said second memory means;

first detection means for detecting a capacity in said second memory means occupied by the image data when the image data stored in said first memory means is image-processed by said image processing means;

second detection means for detecting a vacant capacity of said second memory means; and control means for controlling said convey means to feed the document sheets at a first document sheet interval when the occupied capacity detected by said first detection means is smaller than the vacant capacity detected by said second detection means, and feed the document sheets at a second document sheet interval larger than the first document sheet interval when the occupied capacity detected by said first detection means exceeds the vacant capacity detected by said second detection means.

15. An image processing apparatus according to claim 14 wherein said image processing means compresses the image data.

16. An image processing apparatus according to claim 14 wherein said output means outputs the image data to an image forming apparatus for forming an image on a sheet in accordance with the image data.

17. An image processing apparatus according to claim 14 wherein the predetermined memory capacity of said second memory means is large enough to store a plurality of document sheets of image data.

18. An image processing apparatus according to claim 14 wherein said control means temporarily stops the feed of the document sheet when the vacant capacity is not detected by said second detection means.

19. An image processing apparatus according to claim 18 wherein said control means switches first control to feed the document sheet at the first document sheet interval, second control to feed the document sheet at the second document sheet interval and third control to temporarily stop the feed of the document sheet, during a series of document sheet readings.

20. An image processing apparatus according to claim 19 wherein said control means switches the first, second and third controls at the change of the document sheets.

21. An image processing apparatus according to claim 14 wherein the operation to read the image data stored in said first memory means and the operation to write into said first memory means such image data of the next document sheet fed at the first document sheet interval as read and outputted by said read means into said first memory means are conducted in parallel when the occupied capacity detected by said first detection means is smaller than the vacant capacity detected by said second detection means.

22. An image processing apparatus according to claim 14 wherein the next document sheet fed at the second document sheet interval is read by said read means after the completion of the storing of one page of image data stored in said first memory means into said second memory means when the occupied capacity detected by said first detection means exceeds the vacant capacity detected by said second detection means.

* * * * *

UNITED STATES PATENT AND TRADEMARK OFFICE
CERTIFICATE OF CORRECTION

PATENT NO. : 5,889,596

DATED : March 30, 1999

INVENTOR(S) : HIROYUKI YAGUCHI, ET AL.

It is certified that error appears in the above-identified patent and that said Letters Patent is hereby corrected as shown below:

COLUMN 13:

Line 66, "S1101" should read --S1101--.

COLUMN 20:

Line 31, "predication" should read --prediction--.

Signed and Sealed this

Fifth Day of October, 1999

Attest:

Q. TODD DICKINSON

*Attesting Officer*     *Acting Commissioner of Patents and Trademarks*